United States Patent
United States Patent
Marks et al.

(10) Patent No.: US 9,239,820 B1
(45) Date of Patent: Jan. 19, 2016

(54) METHOD AND APPARATUS FOR SELECTIVE VISUAL FORMATTING OF AN ELECTRONIC DOCUMENT USING A STYLE ELEMENT LOCK STATUS

(71) Applicant: WORKIVA INC., Ames, IA (US)

(72) Inventors: Joel Alan Marks, West Des Moines, IA (US); Winston Joseph Chappell, Ames, IA (US); Edward Yee Ly, Ames, IA (US); Edward Joseph Cupps, Nevada, IA (US); Alan Joseph Streit, Ames, IA (US); John Patrick Ryan, Marshalltown, IA (US)

(73) Assignee: Workiva Inc., Ames, IA (US)

(*) Notice: Subject to any disclaimer, the term of this patent is extended or adjusted under 35 U.S.C. 154(b) by 0 days.

(21) Appl. No.: 14/451,173

(22) Filed: Aug. 4, 2014

Related U.S. Application Data

(60) Provisional application No. 61/924,948, filed on Jan. 8, 2014.

(51) Int. Cl.
    *G06F 17/00* (2006.01)
    *G06F 17/21* (2006.01)
    *G06F 3/0484* (2013.01)

(52) U.S. Cl.
    CPC .......... *G06F 17/212* (2013.01); *G06F 3/04842* (2013.01); *G06F 3/04847* (2013.01); *G06F 17/211* (2013.01)

(58) Field of Classification Search
    CPC . G06F 17/211; G06F 17/212; G06F 3/04847; G06F 3/04842
    USPC .................................................. 715/255, 235
    See application file for complete search history.

(56) References Cited

U.S. PATENT DOCUMENTS

| | | | |
|---|---|---|---|
| 7,120,867 B2* | 10/2006 | Breuer et al. | 715/239 |
| 7,127,670 B2 | 10/2006 | Bendik | |
| 7,231,602 B1* | 6/2007 | Truelove et al. | 715/205 |
| 7,454,700 B1* | 11/2008 | Jones et al. | 715/255 |
| 7,565,603 B1 | 7/2009 | Jones et al. | |
| 7,685,529 B2 | 3/2010 | Shaw et al. | |
| 7,818,663 B2* | 10/2010 | Khaba | 715/229 |

(Continued)

FOREIGN PATENT DOCUMENTS

WO          WO 02/42928 A1     5/2002

OTHER PUBLICATIONS

Google, "Protect sheets from being edited," https://support/google.com/drive/answer/144687?hl=en, 2013, p. 1.

(Continued)

*Primary Examiner* — Cesar Paula
*Assistant Examiner* — Mohammed-Ibrahim Zuberi
(74) *Attorney, Agent, or Firm* — Drinker Biddle & Reath LLP

(57) ABSTRACT

A method for managing display of electronic documents is described. A user interface is generated for a visual style set of visual styles that affect display of electronic document content. A visual style of the visual style set comprises a style element set of style elements. A lock status for a style element of the style element set is received via the user interface. The lock status indicates whether the style element is editable or non-editable by a user of an electronic document associated with the visual style set. The visual style set is stored with the lock status for the style element.

20 Claims, 19 Drawing Sheets

(56) References Cited

U.S. PATENT DOCUMENTS

| | | | |
|---|---|---|---|
| 7,921,360 B1* | 4/2011 | Sundermeyer et al. | 715/255 |
| 8,396,829 B2 | 3/2013 | Kawai | |
| 8,667,387 B2* | 3/2014 | Sahota | G06F 17/214 715/234 |
| 2002/0010717 A1* | 1/2002 | Breuer et al. | 707/517 |
| 2002/0188637 A1 | 12/2002 | Bailey et al. | |
| 2003/0233620 A1 | 12/2003 | Vedullapalli et al. | |
| 2004/0163048 A1 | 8/2004 | McKnight et al. | |
| 2005/0071758 A1* | 3/2005 | Ehrich | G06F 9/4443 715/234 |
| 2005/0144155 A1 | 6/2005 | Van Vlimmeren | |
| 2006/0107203 A1 | 5/2006 | Schilling et al. | |
| 2007/0061714 A1* | 3/2007 | Stuple et al. | 715/529 |
| 2007/0067336 A1 | 3/2007 | Horany | |
| 2007/0136662 A1* | 6/2007 | Khaba | 715/530 |
| 2007/0260971 A1 | 11/2007 | Rivas et al. | |
| 2008/0244440 A1 | 10/2008 | Bailey et al. | |
| 2008/0303945 A1* | 12/2008 | Kang et al. | 348/468 |
| 2009/0006948 A1 | 1/2009 | Parker et al. | |
| 2009/0024917 A1 | 1/2009 | Giannetti | |
| 2009/0083656 A1* | 3/2009 | Dukhon et al. | 715/781 |
| 2010/0077355 A1* | 3/2010 | Belinsky et al. | 715/835 |
| 2010/0199168 A1* | 8/2010 | Balinsky | G06F 17/214 715/234 |
| 2012/0102386 A1* | 4/2012 | Campbell et al. | 715/229 |
| 2014/0095982 A1* | 4/2014 | Pearson | G06F 17/227 715/235 |
| 2014/0258933 A1* | 9/2014 | Dukhon et al. | 715/825 |

OTHER PUBLICATIONS

Microsoft, "Allow changes to parts of a protected document," http://office.microsoft.com/en-us/word-help/allow-changes-to-parts-of-a-protected-document-HA010372706.aspx, 2013, pp. 1-3.

Microsoft, "Create forms that users complete in Word," http://office.microsoft.com/en-us/word-help/create-forms-that-users-complete-in-word-HP005230270.aspx, 2013, p. 1.

Microsoft, "Format your document with styles," http://office.microsoft.com/en-us/word-help/format-your-document-with-styles-RZ001103924.aspx?section=4, 2013, pp. 1-2.

Microsoft, "Introduction to document management," http://office.microsoft.com/en-us/sharepoint-server-help/introduction-to-document-management-HA010201399.aspx, 2013, pp. 1-2.

Microsoft, "Restrict or permit formatting changes," http://office.microsoft.com/en-us/word-help/restrict-or-permit-formatting-changes-HA010090865.aspx, 2013, pp. 1-2.

Microsoft, "Restrict permission to content in a file," http://office.microsoft.com/en-us/mac-world-help/restrict-permission-to-content-in-a-file-HA102927392,aspx, 2013, pp. 1-8.

Solentive Labs, "Welcome to ExactDocs," https://www/exactdocs.com/, 2013, p. 1.

Tour De Force CRM, "Template Management," http://www.tourdeforcecrm.com/crm-software/crm-features/document-management/template-management, 2013, pp. 1-3.

* cited by examiner

METHOD AND APPARATUS FOR SELECTIVE VISUAL FORMATTING OF AN ELECTRONIC DOCUMENT USING A STYLE ELEMENT LOCK STATUS

CROSS-REFERENCE TO RELATED APPLICATION

This disclosure claims the priority benefit of U.S. Provisional Patent Application No. 61/924,948, entitled "Method and Apparatus for Selective Visual Formatting of an Electronic Document" and filed on Jan. 8, 2014, the disclosure of which is incorporated herein by reference in its entirety.

BACKGROUND

1. Field

Various embodiments disclosed herein relate to a method and apparatus for controlling visual formatting of an electronic document.

2. Related Art

An electronic document typically includes document content data and document support data. Document support data may include visual style data in the form of metadata for controlling visual formatting of the electronic document. Visual style data is information that determines how the document content looks or appears when displayed on a screen or printed on paper. For example, visual style data may include information regarding whether text content is in bold, italicized, or underlined, its spacing with respect to other document content, or other visual formatting characteristics.

Conventional systems for storing, viewing, and editing a document in a client-server architecture typically include a server and a thin client device. The server stores the document as a document file in a database and provides processing power on behalf of the thin client device. The document file includes document content data and document support data which is stored together so that the server can properly render the document for viewing or editing on the thin client device.

When organizations or users have multiple electronic documents, they may desire consistent visual formatting or style across the documents. An organization may use a style document with information regarding the desired visual formatting, such as descriptions or examples of visual styles. Where each document has its own document support data, a user must compare each document individually against the style guide to obtain the desired visual formatting. Alternatively, the organization may use a system that stores document content data separately from document support data. While this approach allows for centralized control over the visual styles, some documents may use many different visual styles to accommodate slight differences in visual formatting. For example, four separate visual styles may differ only in whether bold and italics formatting are enabled or disabled (i.e., styles with bold and italics disabled, bold only enabled, italics only enabled, both bold and italics enabled). With additional differences in visual formatting, the number of styles required to cover each variation may be confusing to the user.

SUMMARY

According to an embodiment, a method of managing display of electronic documents includes: generating a user interface for a visual style set of visual styles that affect display of electronic document content, where a visual style of the visual style set includes a style element set of style elements; receiving, via the user interface, a lock status for a style element of the style element set, where the lock status indicates whether the style element is editable or non-editable by a user of an electronic document associated with the visual style set; and storing the visual style set with the lock status for the style element.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

As described herein, various embodiments of a method and apparatus for controlling visual formatting of an electronic document include a server and a client device. A method for managing display of electronic documents includes generating a user interface for a visual style set of visual styles that affect display of electronic document content. A visual style of the visual style set includes a style element set of style elements. A lock status for a style element of the style element set is received via the user interface. The lock status indicates whether the style element is editable or non-editable by a user of an electronic document associated with the visual style set. The visual style set is stored with the lock status for the style element.

With centralized control over visual styles, many visual styles may be needed to allow a user to select a visual style with only a slight difference in visual formatting. Instead of providing multiple visual styles to accommodate the differences, a single visual style that a user may selectively modify is provided. For example, a user interface may be provided to a user that allows selection of a visual style and selective modification of a bold formatting feature, italics formatting feature, or other style elements. Accordingly, a visual style may be "locked down" while still allowing some flexibility to the user.

The style elements for a visual style may be modified and selectively locked by a user (e.g., a style guide manager). For example, the style guide manager may set the font face and emphasis formatting of a "Heading 1" style to "Arial" and "bold," respectively. The manager may then lock one or more of the style elements to prevent their modification by other users (e.g., style guide users). After making changes to a style guide, the manager may publish the style guide, enabling its use by the style guide users. The style guide user may view and modify the unlocked style elements. The style guide user may view but not modify the locked style elements. The locked style elements may be "grayed out" or displayed with a lock indication (such as a padlock icon).

Figure 1:
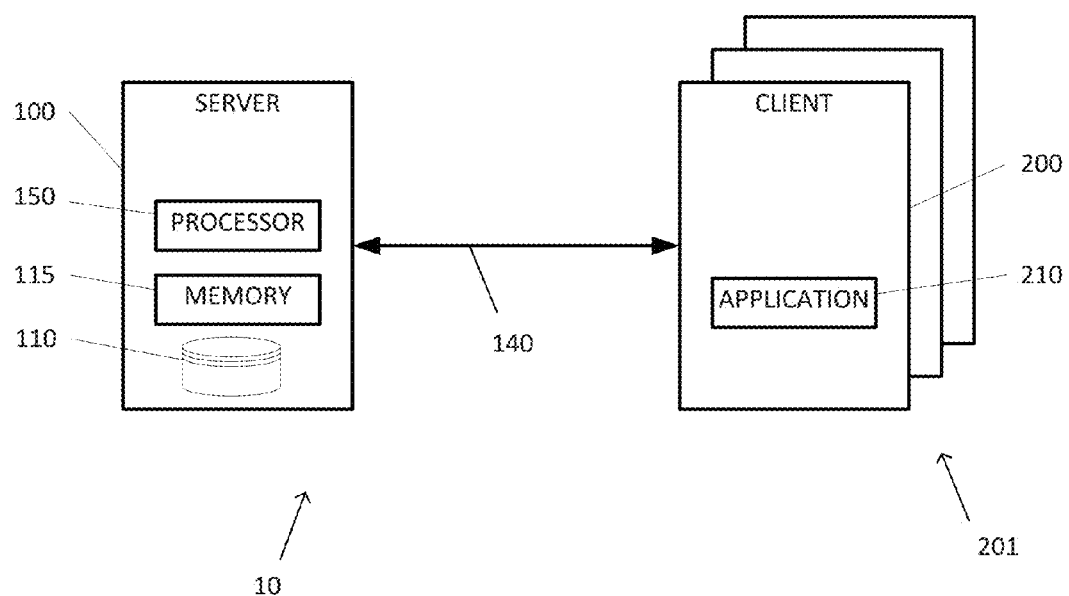
FIG. 1 is a block diagram illustrating a system for controlling visual formatting of an electronic document, according to an embodiment.

In more detail, FIG. 1 is a block diagram illustrating a system 10 for controlling visual formatting of an electronic document, according to an embodiment. The system 10 includes a server 100 and a client device 200. In other embodiments, the system 10 may include one or more additional instances 201 of the client device 200. The server 100 may include a database 110, a memory 115, and a server processor 150. The database 110 stores document files (e.g., document content data and document support data), visual style sets (e.g., style data), or other files. The document content data may include text, tables, images, or other content. The document support data includes a reference or link to a visual style set (or "style guide") for display of the document content data. Although FIG. 1 shows that the server 100 includes one processor, in other embodiments, the server 100 may include any number of processors.

The client device 200 is connected to the server 100 via a communication link 140. The communication links 140 may include, for example, Wi-Fi, 3G networks, 4G networks, or other telecommunication networks known in the art. At least one application 210 is provided by the server 100 via the client device 200. The server 100 in one example provides the application 210 to the client device 200, for example, during an installation, initialization, registration, or syncing procedure. Alternatively, the application 210 may be installed by a user. The client device 200 may include a tablet PC, a mobile phone, a smart phone, a laptop, a computer terminal, and any other client devices known in the art. In the following, a single reference character may be used to represent multiple elements. For example, a "client device 200" may be referenced, but this could possibly include the client device 200 and one or more of the additional instances 201 of the client device 200.

Figure 2:
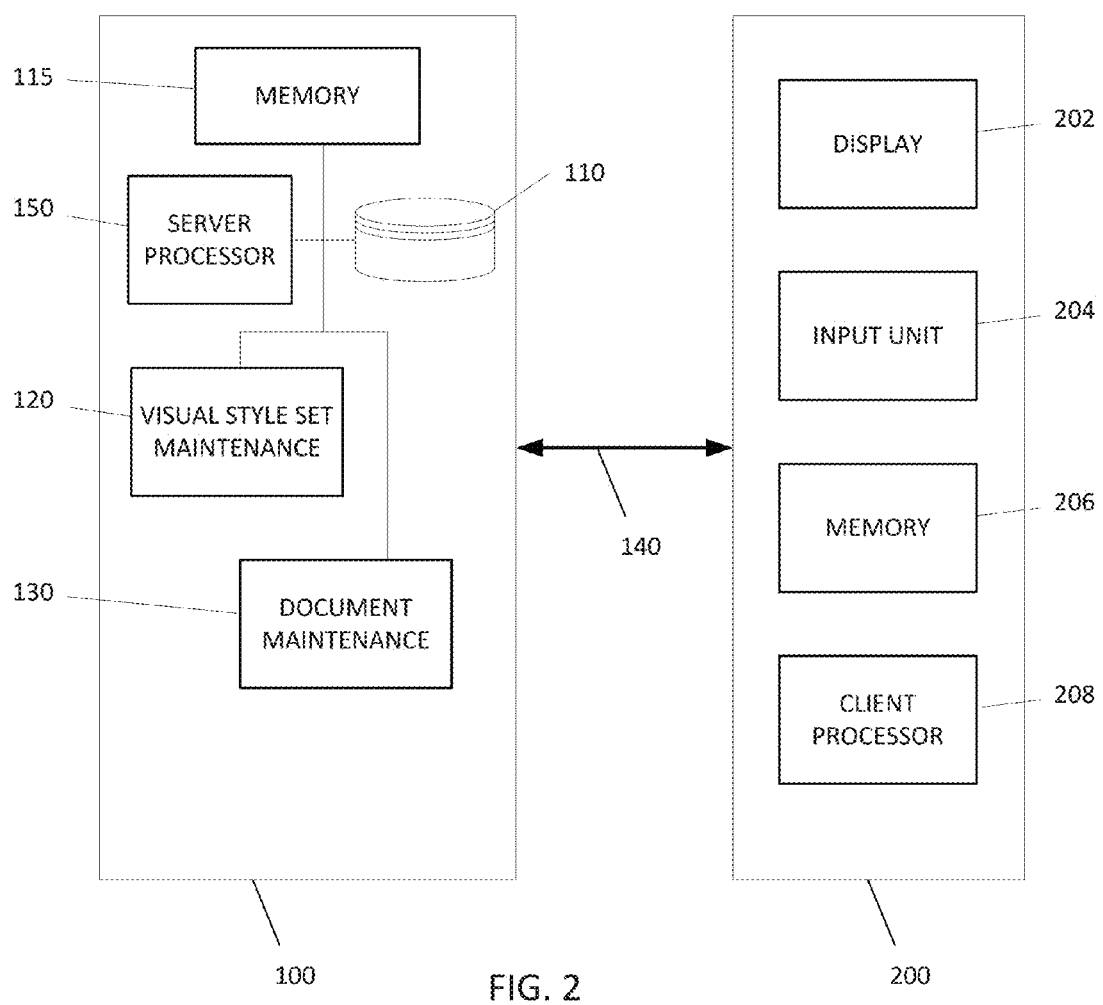
FIG. 2 is a block diagram illustrating a server and a client of the system of FIG. 1, according to an embodiment.

FIG. 2 is a block diagram illustrating the server 100 and the client device 200 of FIG. 1. The server 100 includes the document database 110, the memory 115, and the server processor 150. The server processor 150 performs a visual style set maintenance process 120 and a document maintenance process 130. The client device 200 is connected to the server 100 via the communication link 140. The client device 200 may include a display 202, an input unit 204, a memory 206, and a client processor 208. The display 202 may be, for example, a liquid crystal display (LCD), a LED-LCD, or other displays known in the art. The input unit 204 may be, for instance, a touch screen, a stylus, a keypad, a keyboard, or other input devices known in the art.

The application 210 allows a user to create, view, or modify visual style sets, as described herein. The application 210 also allows a user to access, download, view, or edit various electronic documents stored in the document database 110 of the server 100 based on one or more of the visual style sets. The application 210 may also include a user authentication feature, where the user is required to enter a username and password, or other credentials, before the user is permitted to access electronic documents or visual style sets stored on the server 100.

The application 210 may be executed by the server processor 150 or the client processor 208, or both (e.g., as two instances of the application 210 or separate server and client applications). In one example, the server processor 150 executes the application 210 and provides a user interface as an output to the client device 200 via the communication link 140. In another example, the server 100 provides data and document content to the client device 200 which allows the client device 200 to execute the application 210. In this case, the data may include one or more of a user interface generation process or one or more visual style sets. "Generating the user interface" may refer to generating an image or display of a user interface or generating data that may be interpreted or executed by the client device 200 for display of the user interface to the user of the client device 200.

Figure 3:
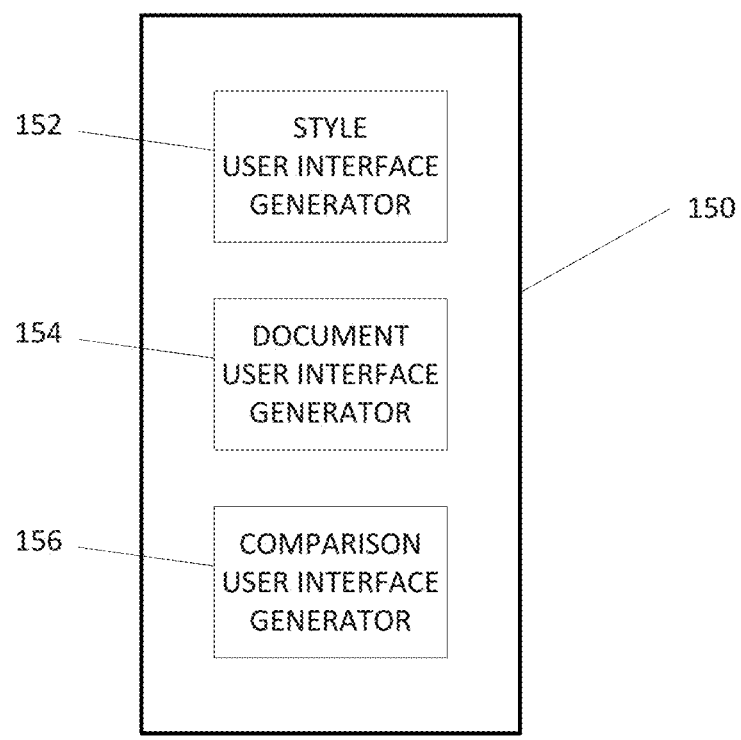
FIG. 3 is a block diagram illustrating components of a server processor of the server of FIG. 2, according to an embodiment.
Figure 9:
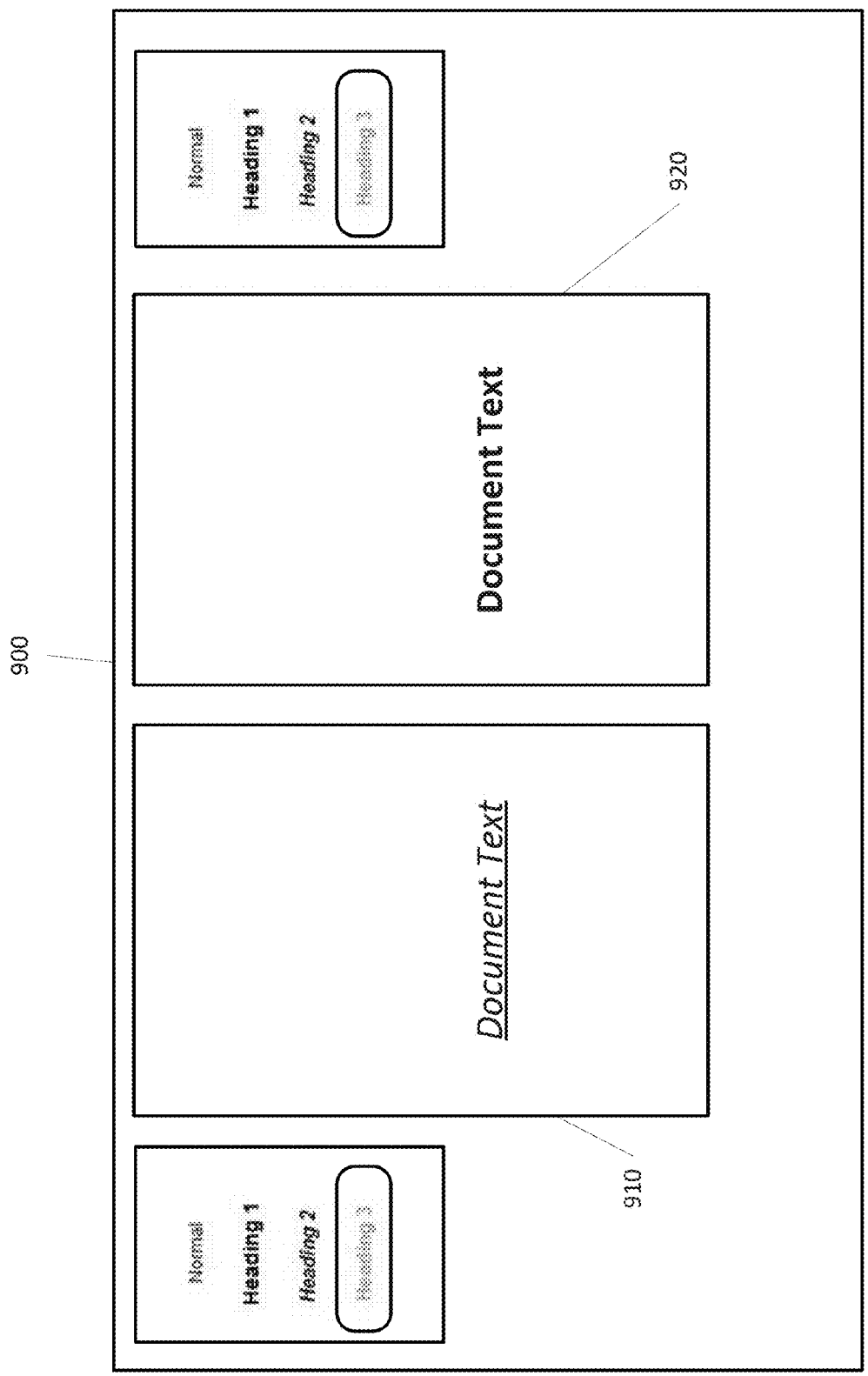
FIG. 9 is a diagram illustrating a user interface, provided by the system of FIG. 1, for comparing first and second visual style sets, according to an embodiment.

FIG. 3 is a block diagram illustrating components of a server processor 150, according to an embodiment. The server processor 150 may include one or more of a style user interface generator 152, a document user interface generator 154, or a comparison user interface generator 156. The style user interface generator 152 performs all or a portion of the visual style set maintenance process 120. The document user interface generator 154 and comparison user interface generator 156 perform all or a portion of the document maintenance process 130. The style user interface generator 152, the document user interface generator 154, and the comparison user interface generator 156 may cooperate with the application 210 to provide user interfaces 400 (FIG. 4), 500, (FIG. 5), 700 (FIG. 7), or 900 (FIG. 9). Each component illustrated in FIG. 3 may be implemented by any number of hardware and/or software components configured to perform the specified functions. Although the components are illustrated as a part of the server processor 150 in the present embodiment, the components may be separate and independent from the server processor 150 in other embodiments.

Figure 4:
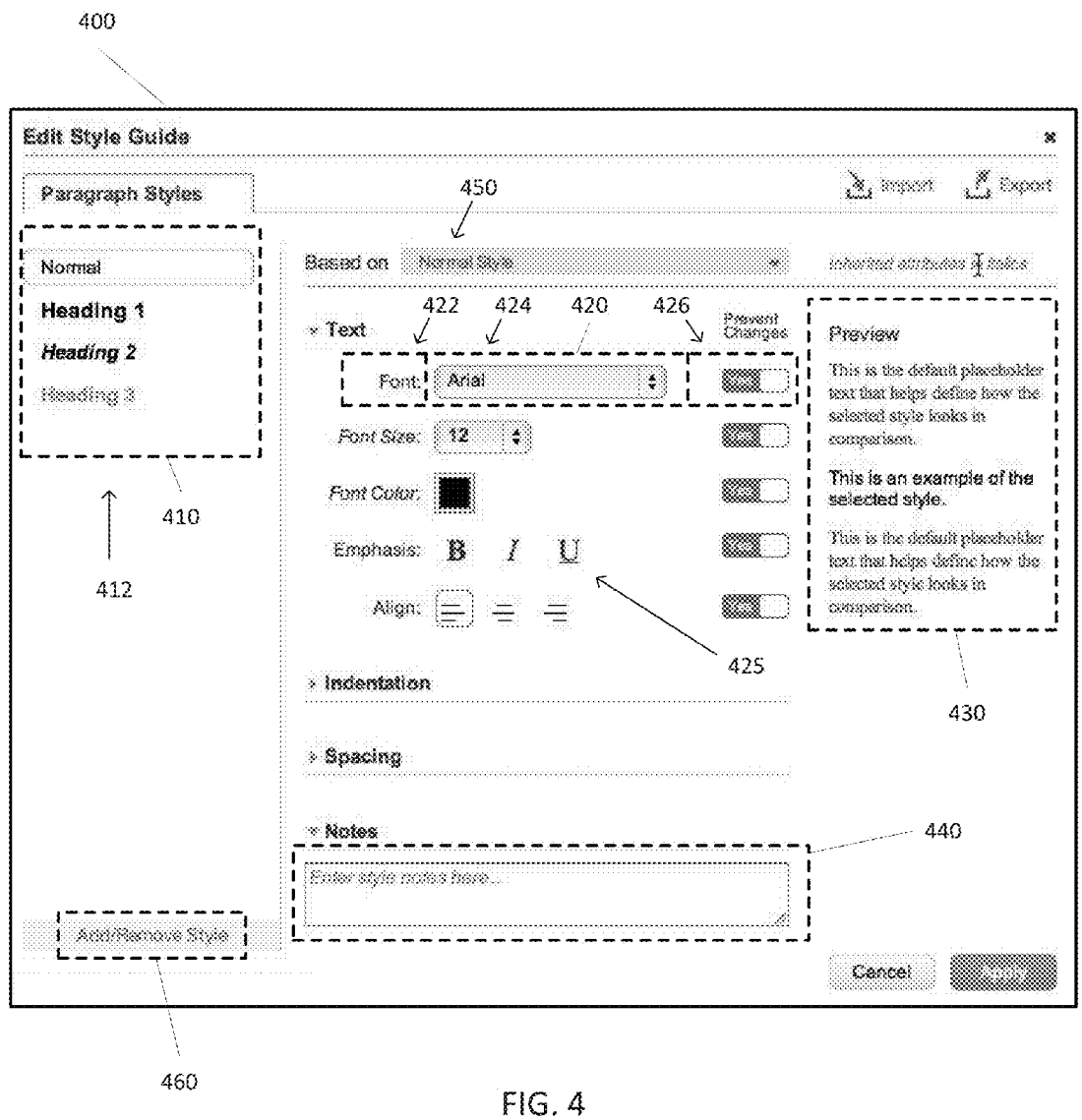
FIG. 4 is a diagram illustrating a user interface, provided by the system of FIG. 1, for editing a visual style set of visual styles that affect display of electronic document content, according to an embodiment.

FIG. 4 is a diagram illustrating a style user interface 400, provided by the system 10 (e.g., via the application 210) for viewing or editing a visual style set of visual styles (e.g., a "style guide") that affect display of electronic document content, according to an embodiment. As illustrated in FIG. 4, a visual style is a paragraph style that includes one or more style elements for visual formatting of document content to which the visual style is applied. Example style elements include font face, font size, font color, emphasis formatting (e.g., bold, italics, underline, strikethrough), alignment (e.g., left-aligned, centered, right-aligned, justified, superscript, subscript), spacing (e.g., paragraph indentation, tab stops, paragraph spacing, line spacing, character spacing), borders, background colors, hyperlink characteristics, or other visual characteristics. While paragraph styles are shown as a style type in FIG. 4, other style types may also be used, such as table styles, image styles, legend styles, header styles, graph styles, chart styles, or others as will be apparent to those skilled in the art. For example, a table style may include row heights, column widths, fonts, borders, background colors, fill patterns, text alignment, header rows or columns, footer rows or columns, or other style elements. In another example, an image style may include transparency, color model, compression type, image size, scaling, or other style elements. In yet another example, list styles (e.g., bulleted list styles or numbered list styles) may include style elements that affect number formatting, selection of glyph or icons for bullets, or other style elements. As another example, a chart style may have style elements for a legend or type of chart (e.g., a bar chart, pie chart, line chart).

Tables may also use one or more cell styles, row styles, column styles, header row styles, or header column styles, with each style having one or more style elements. While a header row style or header column style is generally selected for a first row or column of a table, these styles may also be selected for other rows or columns of a table. One or more cells of a table may correspond to multiple table styles, such as a row style and a column style. For example, a cell "B3" may correspond to a column style for a column "B" and a row style for a row "3." In this case, the row style and column style may overlap or conflict with each other.

In some embodiments, styles include a priority indicator such that where two or more styles are applied to a same document content element (e.g., the styles overlap), the style with a highest priority is used for that document content element. In another example, the style elements of the styles include respective priorities such that where two or more styles overlap, the style elements for the two or more styles with highest priorities are used. In this case, a font face style element of a column style and a font size style element of a row style may be selected and combined based on their respective priorities. In yet another example, only those style elements that are locked are combined based on their priorities. Alternative embodiments for combining styles or style elements, such as default values or default rules, will be apparent to those skilled in the art.

The style user interface 400 includes a style display portion 410 with a set of selection indicators 412 for visual styles of a visual style set. The style user interface 400 does not display document content of an electronic document. In the example shown in FIG. 4, the visual style set includes Normal, Heading 1, Heading 2, and Heading 3 visual styles. When a visual style is selected (e.g., by clicking on the corresponding selection indicator), the application 210 displays one or more element display portions 420. The element display portions 420 correspond to style elements of a style element set for the selected visual style. As shown in FIG. 4, the element display portions correspond to the Normal visual style. Each displayed element display portion 420 includes one or more of a description 422 or other identifier of the style element, a selection indicator 424 for a current default value of the style element, and a lock indicator 426 for a lock status of the style element. The style element set thus corresponds to a lock status set of lock statuses. While the selection indicator 424 is shown as a drop-down box, other implementations such as toggle buttons 425 may also be used. The user may change the default value of the style element by clicking or interacting with the selection indicator 424.

The lock status of the style element may be locked or unlocked and is user-editable via the element display portion 420. The lock status indicates whether the style element is editable (unlocked) or non-editable (locked) by a user of an electronic document associated with the visual style set 412. As illustrated in FIG. 4, the lock indicator 426 includes a YES (locked) or NO (unlocked) to indicate whether changes to the style element are allowed. The user may change the lock status of the style element by clicking or interacting with the lock indicator 426. While the lock indicator 426 as illustrated allows for only a locked or unlocked status, in other embodiments the lock status and lock indicator 426 may allow for multiple locks based on user permissions or other criteria, such as a style element priority. In this case, a separate lock status may be used for a Lead Editor, an Assistant Editor, a Drafter, or other users. Information for permissions or other criteria may be stored in the document support data for an electronic document or as style data (e.g., as separate styles for user names, groups, or other criteria).

The style user interface 400 may further include a preview display portion 430 and a description display portion 440. The preview display portion 430 displays a document content element (such as text) based on a current value of the selection indicator 424 for each style element of the style element set of the selected visual style. Thus, the preview display portion 430 provides a sample of the selected visual style to a user so that the user may see changes in real-time without affecting actual electronic documents. The description display portion 440 displays a use description for the selected visual style. The use description is user-editable via the description display portion 440 and may be displayed to a user of an electronic document by the application 210, for example, as a tooltip. In one example, the application 210 displays the use description upon a mouse-hover event for the corresponding selection indicator of the selection indicator set 412.

In some embodiments, a visual style may be based on one or more other visual styles and thus inherit the style elements of a parent style. For example, a Heading 2 style may be based on a Heading 1 style. In this case, the style user interface 400 includes an inheritance indicator 450 that indicates which visual style is the parent style from which the style elements have been inherited.

Figure 5:
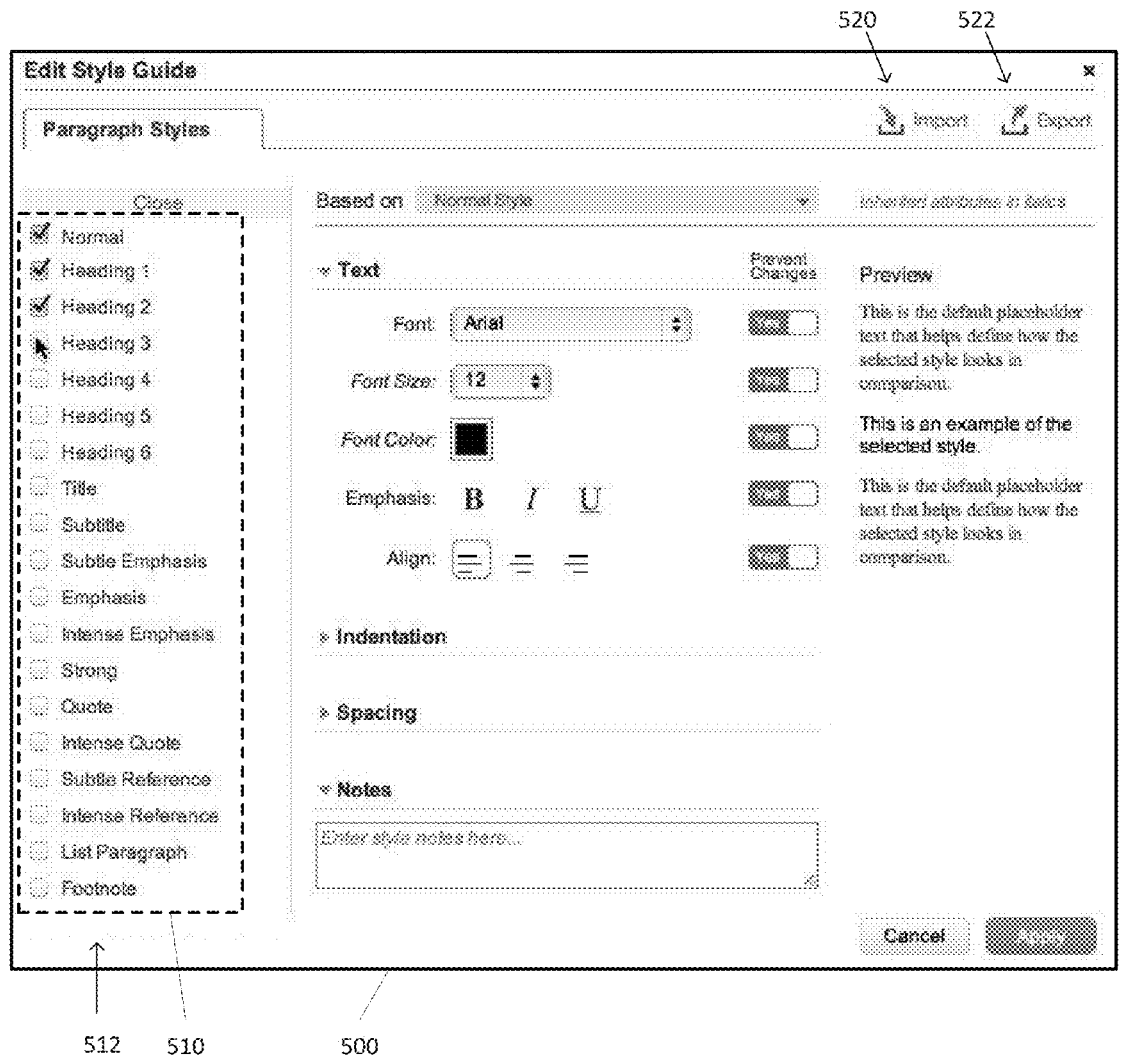
FIG. 5 is a diagram illustrating another user interface, provided by the system of FIG. 1, for editing the visual style set of FIG. 4, according to an embodiment.

FIG. 5 is a diagram illustrating another style user interface 500 provided by the system 10 for editing the visual style set of FIG. 4, according to an embodiment. Visual styles may be added or removed from the style set. In this case, the style user interface 400 includes an "Add/Remove Style" button 460. As shown in FIG. 5, the application 210 displays the style user interface 500 with a style display portion 510. The style display portion 510 includes a selection indicator set 512 of selection indicators that correspond to a predetermined set of visual styles (Normal, Heading 1, . . . , and Footnote). The user may select one or more visual styles for a style guide from the predetermined set by clicking a corresponding checkbox. While nineteen visual styles are shown in FIG. 5, additional or fewer visual styles may be used. In other embodiments, the style user interface 500 allows the user to create or modify visual styles with customized names and to delete visual styles from the style guide.

The application 210 may also provide an import or export feature for managing visual styles and style guides. As shown in FIG. 5, the style user interface 500 includes import button 520 and export button 522. When the export button 522 is selected by a user, the application 210 prompts the user to store the current style guide. The application 210 may store the style guide as style data within a file. In some embodiments, the application 210 stores or publishes the style guide in a version control system. The visual style set maintenance process 120 in one example provides the version control system. In other embodiments, the version control system is a separate application or process and may be remotely located from the server 100 and client device 200. When the import button 520 is selected by a user, the application 210 prompts the user to select a file or version of a previously stored style guide.

As described above, the document support data for an electronic document includes a reference or link to a visual style set or style guide. If a version control system is used, the user may update the style guide over time and maintain one or more prior versions of the style guide. In this case, the reference to the style guide includes a version identifier that corresponds to a version of the style guide to be used when displaying the electronic document.

Figure 6:
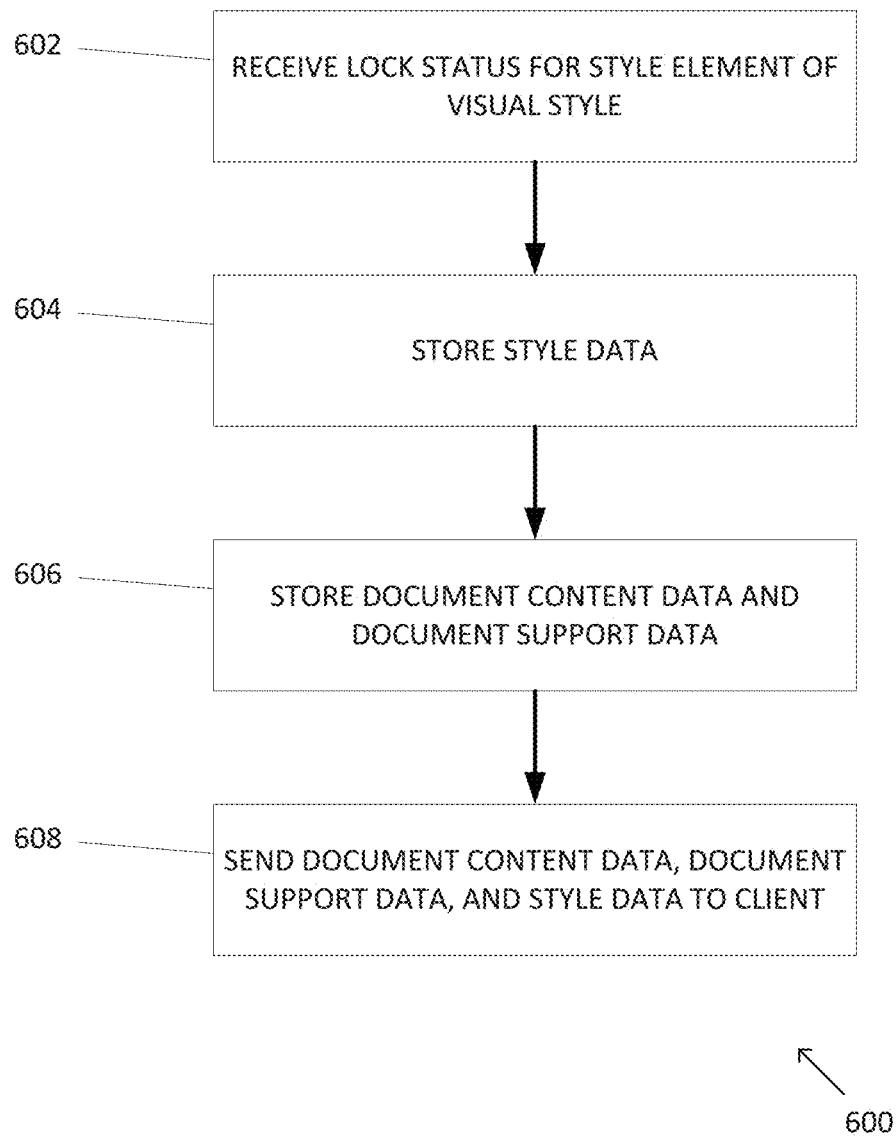
FIG. 6 is a flowchart illustrating a method for managing display of electronic documents that may be performed by the system of FIG. 1, according to an embodiment.

FIG. 6 is a flowchart 600 illustrating a method for managing display of electronic documents that may be performed by the system 10, according to an embodiment. The server 100 receives (602) one or more lock statuses for style elements of a visual style. The server 100 may receive the lock statuses from the client device 200 that displays the style user interfaces 400 or 500. The lock status may be received as separate information (e.g., an update for the lock status), as data corresponding to an updated visual style with the updated lock status included therein, or as data corresponding to an updated style set that includes the updated visual style. The server 100 stores (604) style data with the received lock statuses. As described above, the style data may be stored as a file or in the version control system. The server 100 stores (606) document content data and document support data for an electronic document separately from the style data. The electronic document includes a reference to the stored style data. Upon a request for the electronic document by the client device 200, the server 100 sends (608) the document content data, the document support data, and the style data to the client device 200. The client device 200 renders the electronic document for viewing or editing based on the document content data, the document support data, and the style data. In alternative embodiments, the user may request a non-editable version of the electronic document, such as an image file or portable document format ("PDF") file. In this case, the server 100 generates the non-editable document based on the document content data, the document support data, and the style data.

Figure 7:
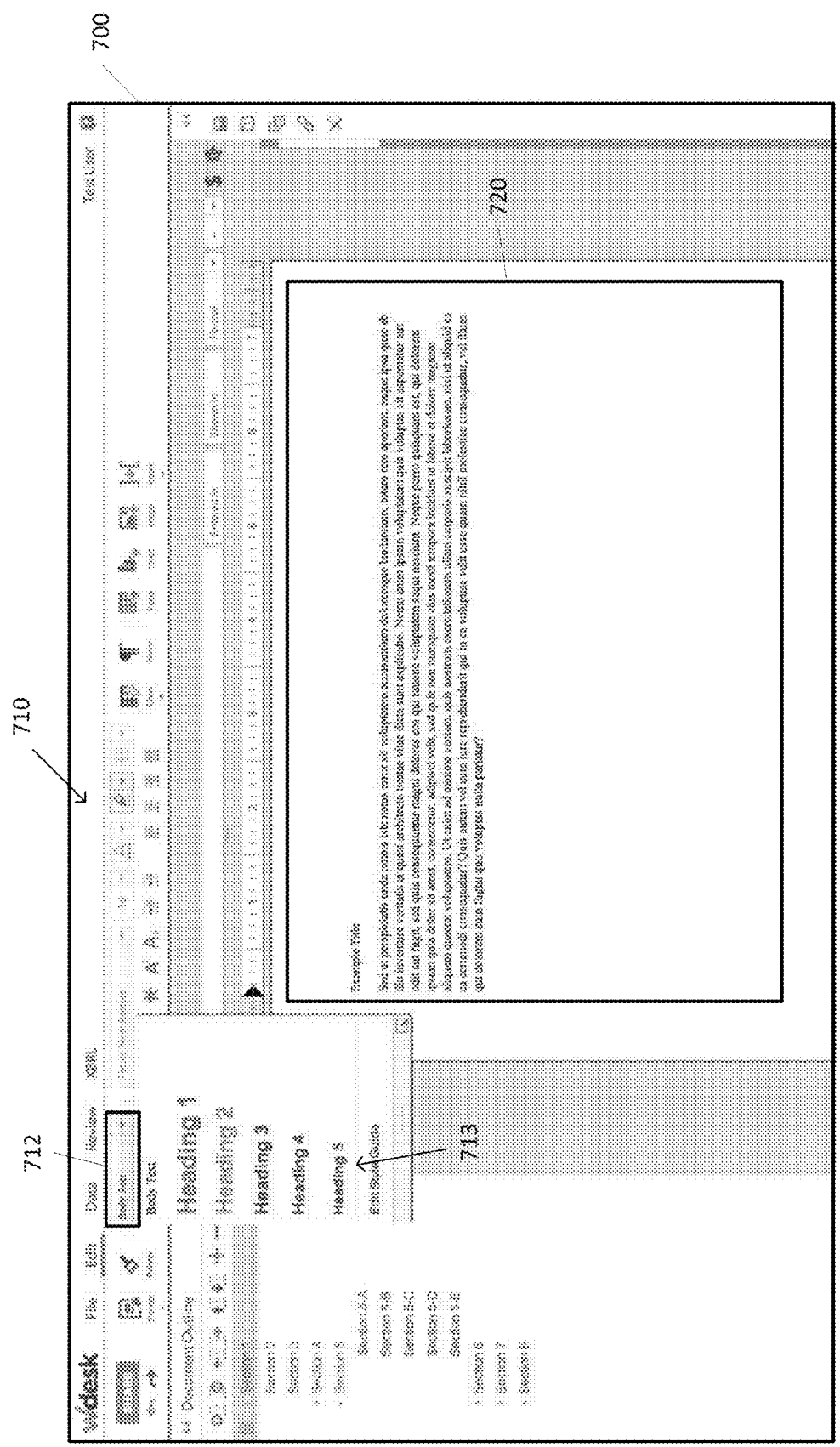
FIG. 7 is a diagram illustrating a user interface, provided by the system of FIG. 1, for using a visual style set for an electronic document, according to an embodiment.
Figure 8:
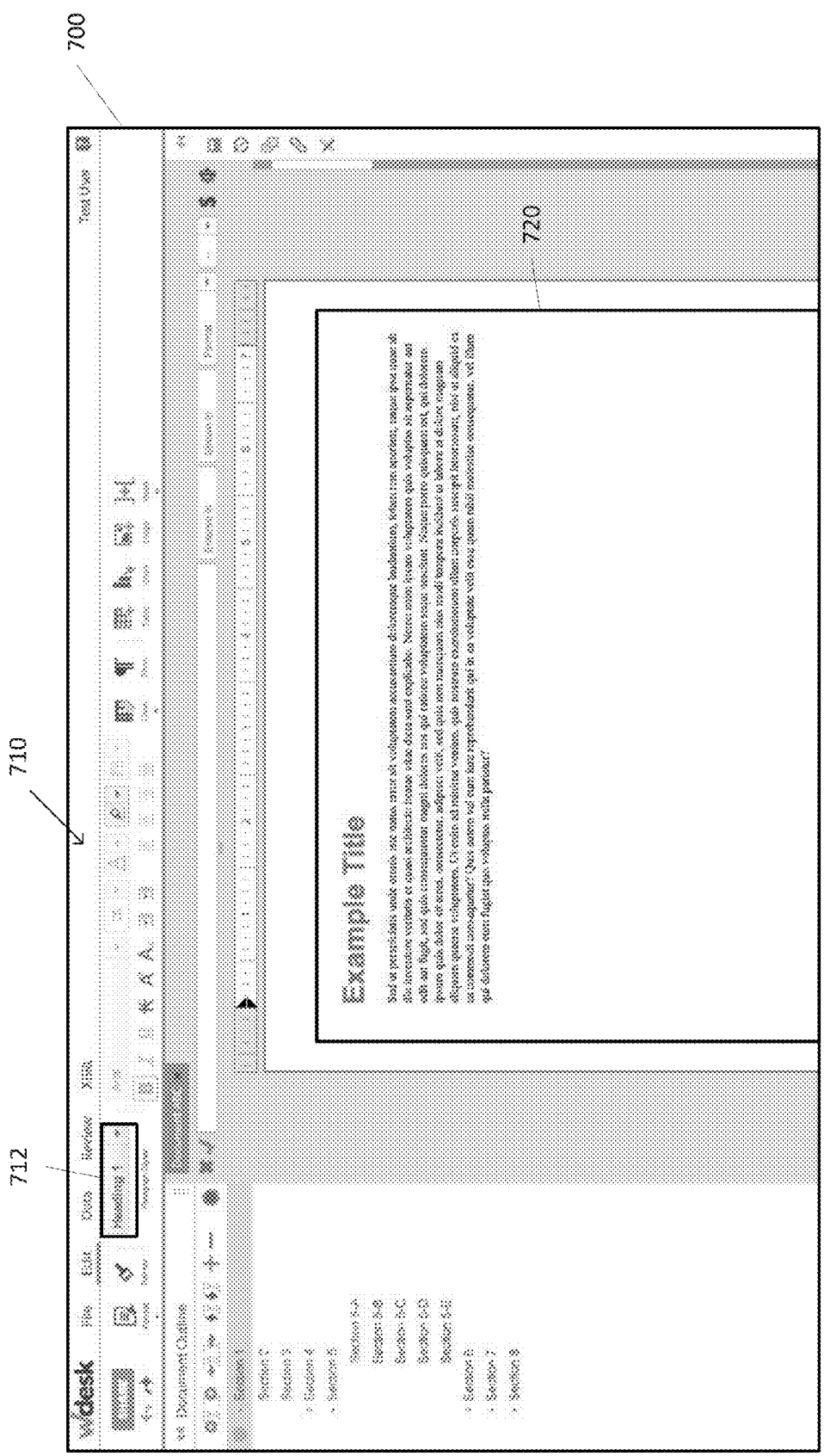
FIG. 8 is another diagram illustrating the user interface of FIG. 7, according to an embodiment.

FIG. 7 and FIG. 8 are diagrams illustrating a document user interface 700 provided by the system 10 for using a visual style set for an electronic document, according to an embodiment. While the style user interfaces 400 and 500 are used for viewing and modifying a visual style or style guide, the document user interface 700 is used for viewing and modifying an electronic document. The client device 200 displays the document user interface 700 based on the document content data, the document support data, and the style data received from the server 100. The document user interface 700 includes a style editing portion 710, a style selection indicator 712, and a document display portion 720. The client device 200 renders the document content data based on the style data and displays the document content in the document display portion 720.

The style selection indicator 712 indicates a currently selected visual style of a visual style set. While the style selection indicator 712 is shown as a drop-down box, other implementations such as toggle buttons may also be used. In other embodiments, the style selection indicator 712 may be implemented as a dialog box that shows a plurality of visual styles of the visual style set. In this case, the user may more easily recognize that multiple styles are selected for a particular document content element and to change those selected visual styles. The document user interface 700 in one example allows a user to toggle between a drop-down box or dialog box for the style selection indicator 712, or alternatively, to make the drop-down box or dialog box "sticky" on the document user interface 700. In this case, the user may select or move the dialog box to more easily view multiple styles while viewing a document content element, such as in a table of a document. The user may change the selected visual style by clicking or interacting with the style selection indicator 712. As shown in FIG. 7, clicking on the style selection indicator 712 causes the client device 200 to display a set of selection indicators 713 for visual styles of the visual style set. Selecting another visual style (e.g., Heading 1) changes the visual style associated with a portion of the document content. Referring to FIG. 8, the visual style Heading 1 has been selected and a portion of the document content (i.e., "Example Title") has been updated to be displayed based on the Heading 1 visual style. Where multiple styles are selected for a same document content element, the style selection indicator 712 may provide a visual indication of the selected styles, for example, using check boxes, highlighting of the selected visual styles, or other indications, as will be apparent to those skilled in the art.

The style editing portion 710 allows for editing the visual characteristics of the document content based on the selected visual style. As shown in FIG. 7 and FIG. 8, the style editing portion 710 may be implemented as a toolbar with one or more selection indicators (e.g., buttons or drop-down boxes) that correspond to the style elements of the visual styles. In other embodiments, the style editing portion 710 may be implemented as a dialog box. The document user interface 700 in one example allows the user to toggle between the drop-down box or dialog box for the style editing portion 710 or make either "sticky" on the document user interface 700. The style editing portion 710 allows the user to view and modify unlocked style elements, and to view but not modify the locked style elements. As shown in FIG. 7 and FIG. 8, the selection indicators corresponding to locked style elements are displayed as "grayed out" or disabled to indicate they cannot be modified, in contrast to an enabled selection indicators. In other implementations, the selection indicator may be displayed with a lock indication (such as a padlock icon). In this implementation, user inputs are controlled by providing a user interface that allows only valid user inputs instead of comparing a received user input with a set of rules to determine whether the input should be performed. In another implementation, the user interface 700 allows the user to change the style element for locked style elements, but instead provides a notification to the user to indicate that the user is deviating from the visual style set.

In some embodiments, the electronic document may have existing styles applied to the document content. The styles may be implicit (e.g., a paragraph style with bold formatting enabled by default) or explicit (e.g., manually enabled bold formatting). In this case, a locked style element takes precedence over both implicit and explicit formatting. If the style element is unlocked, explicit formatting takes precedence and implicit formatting uses the default value for the style element. Other variations of precedence will be apparent to those skilled in the art. Alternatively, all implicit and explicit style elements in an electronic document may be removed when the style guide is applied.

FIG. 9 is a diagram illustrating a comparison user interface 900 provided by the system 10 for comparing first and second visual style sets, according to an embodiment. When a first visual style set has been changed and saved by a style guide manager (e.g., re-published as a second visual style set), a user of an electronic document that references the first visual style set may receive a prompt (e.g., a pop-up window) for conversion of the electronic document to the second visual style set.

The server 100 in one example determines, for an electronic document associated with the first visual style set, whether the first visual style set corresponds to a second visual style set. In this case, the second visual style set may have an updated version identifier, a higher priority indicator, or other relationship to the first visual style set. The application 210 in this case notifies the user by sending a message or prompting for a style selection based on the first visual style set and the second visual style set. Thus, the user may select which style set should be applied to the electronic document.

The application 210 in one example displays the comparison user interface 900 as the prompt for the style selection. The application 210 generates a first document display portion 910 of the comparison user interface 900 that displays the electronic document based on the first visual style set. The application 210 generates a second document display portion 920 of the comparison user interface 900 that displays the electronic document based on the second visual style set of visual styles, without modification to the association between the electronic document and the first visual style set. The comparison user interface 900 thus displays a preview of the electronic document with a comparison between the first and second visual style sets allowing the user to choose whether to accept the second visual style set. In another embodiment, the comparison user interface 900 uses a single document display portion, but instead toggles the document display portion between the first visual style set and the second visual style set without modification to the association between the electronic document and the first visual style set.

Figure 10:
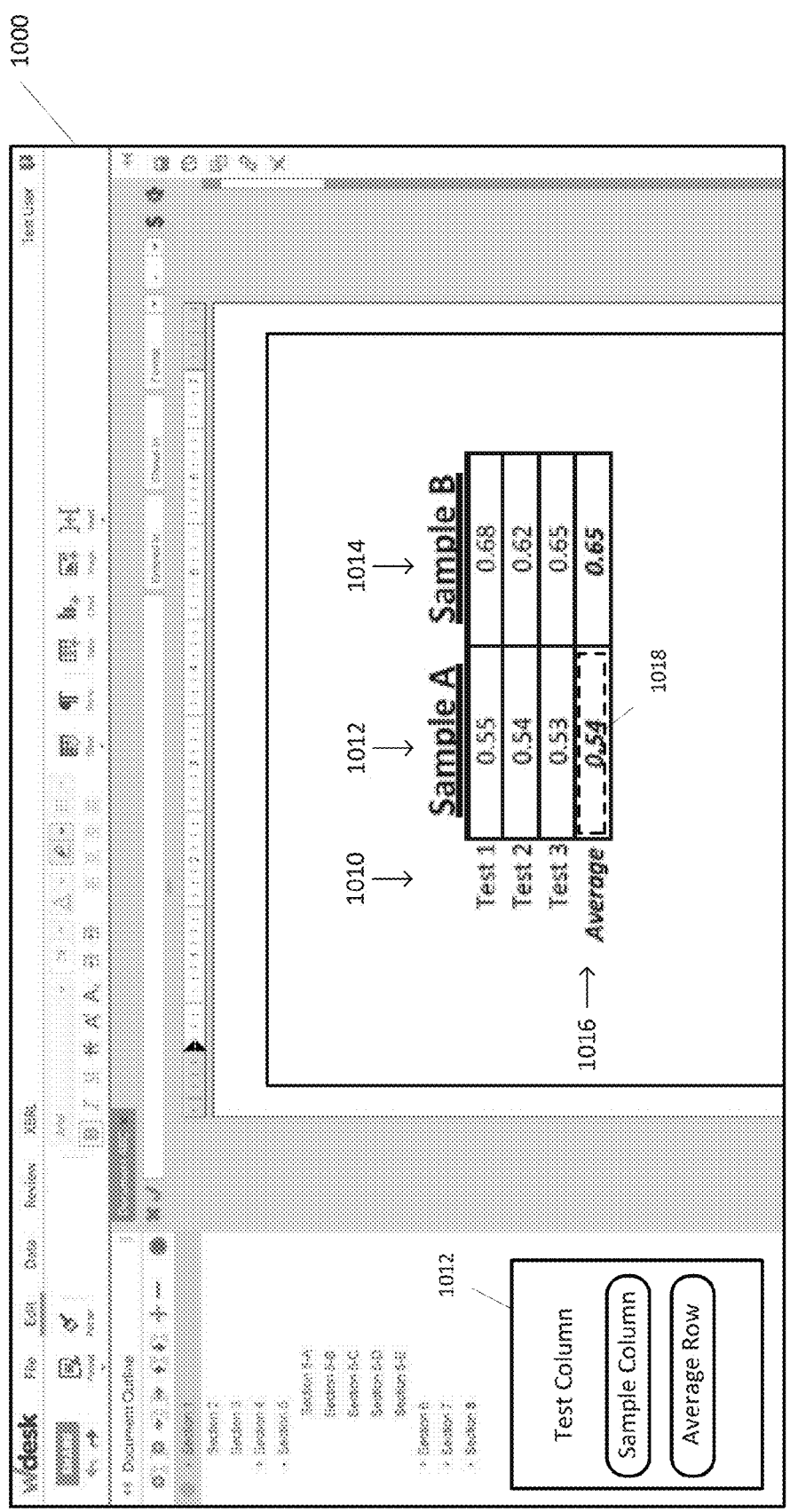
FIG. 10 is another diagram illustrating the user interface of FIG. 7, according to an embodiment.

FIG. 10 is another diagram illustrating a document user interface 1000 provided by the system 10 for using a visual style set for an electronic document, according to an embodiment. The document user interface 1000 is used for viewing and modifying an electronic document, analogous to the document user interface 700, and illustrates row styles and column styles for a table. The document user interface 1000 includes a style selection indicator 1012, implemented as a dialog box with a plurality of visual styles of a visual style set. The visual style set includes a "Test Column" style, a "Sample Column" style, and an "Average Row" style. The Test Column style, which is applied to a column 1010, has "right-alignment" as a locked style element. The Sample Column style, which is applied to columns 1012 and 1014, has "center-alignment" as a locked style element. The Average Row style, which is applied to row 1016, has "bold" and "italics" formatting as locked style elements. FIG. 10 illustrates a cell 1018 that has been selected within column 1012 and row 1016. In the example shown, the cell 1018 corresponds to both the Sample Column style and the Average Row style and is displayed with a combination of the locked style elements. Thus, the cell 1018 is displayed with the center-alignment style element (e.g., from the Sample Column style) and the bold and italics formatting style elements (e.g., from the Average Row style).

Figure 11:
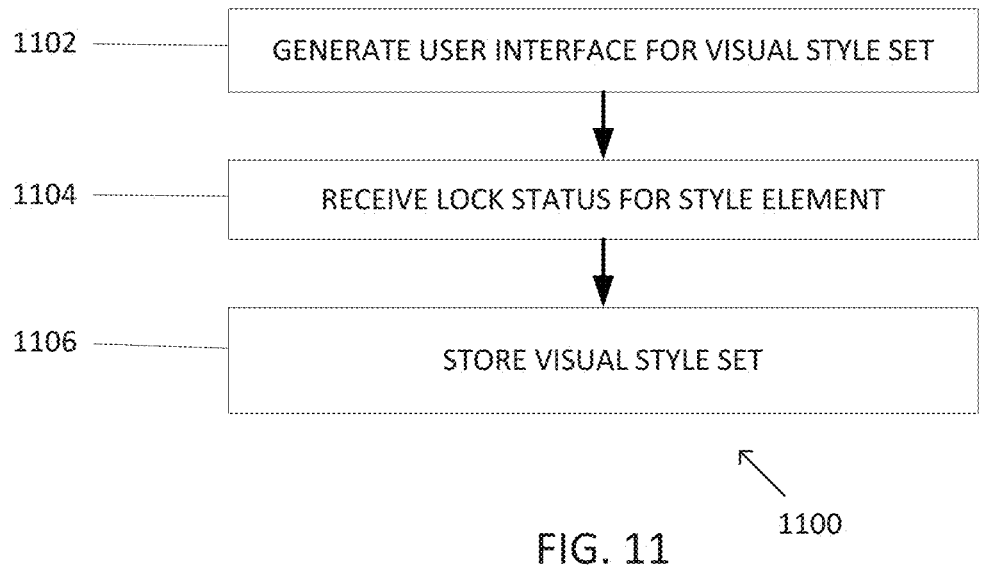
FIG. 11 is a flowchart illustrating a method for managing display of electronic documents that may be performed by the system of FIG. 1, according to an embodiment.

FIG. 11 is a flowchart 1100 illustrating a method for managing display of electronic documents that may be performed by the system 10 of FIG. 1, according to an embodiment. The flowchart 1100 in one example is performed upon a request of a user to edit a style guide or visual style set. The server 100 generates (1102) a user interface (e.g., style user interface 400 or 500) for a visual style set of visual styles that affect display of electronic document content. In one example, the style user interface generator 152 generates a display of the user interface as an image and sends the image to the application 210 for display on the client device 200. In another example, the style user interface generator 152 cooperates with the application 210 to provide the interface as a web-based interface, such as through hypertext markup language (HTML), asynchronous JavaScript and XML (AJAX), or web-based applications (e.g., Adobe Flash or Microsoft Silverlight) as will be apparent to those skilled in the art.

The server 100 receives (1104), via the generated user interface, a lock status for a style element of the style element set. For example, when the user changes the lock status of the style element by clicking or interacting with the lock indicator 426, the changed lock status is sent to the server 100. In some implementations, the lock status is sent to the server 100 by the application 210. In other implementations, an indication of a user interaction (e.g., a mouse click on a portion of the user interface) is sent to the server 100 and the server 100 determines that the user interaction corresponds to a change in lock status for a style element. The server 100 stores (1106) the visual style set with the changed lock status for the style element. For example, the server 100 may publish the visual style set with a version control system.

Figure 12:
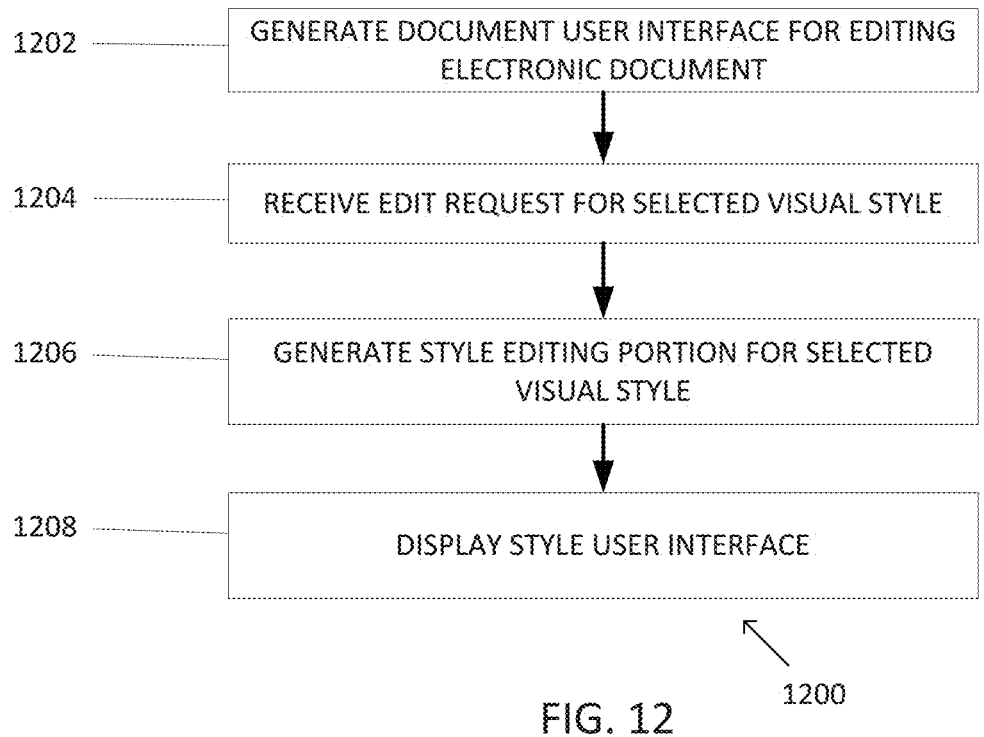
FIG. 12 is a flowchart illustrating a method for managing display of electronic documents in a client-server architecture that may be performed by the system of FIG. 1, according to an embodiment.

FIG. 12 is a flowchart 1200 of a method for managing display of electronic documents in a client-server architecture that may be performed by the system of FIG. 1, according to an embodiment. The flowchart 1200 in one example is performed upon a request of a user to edit an electronic document. The server 100 generates (1202) a document user interface (e.g., the document user interface 700) for editing an electronic document. As described above with reference to step 1102, the document user interface may be generated as an image or web-based interface. The electronic document is associated with a visual style set of visual styles. In the example shown in FIG. 7, the visual style set includes Body Text, Heading 1, Heading 2, Heading 3, Heading 4, and Heading 5 visual styles.

The server 100 receives (1204) an edit request for a selected visual style of the visual style set. The server 100 generates (1206) the style editing portion 710 of the document user interface for editing the selected visual style. The client device 200 displays (1208) the document user interface with the style editing portion to the user of the electronic document. The server 100 generates the style editing portion based on a lock status set of lock statuses. The lock status set corresponds to the style element set for the selected visual style.

When generating or updating the style editing portion 710, the server 100 generates an enabled element editing portion for each style element of the style element set with a lock status that indicates the style element is editable by the user of the electronic document. The server 100 generates the style editing portion with a disabled element editing portion for each style element of the style element set with a lock status that indicates the style element is non-editable by the user of the electronic document. For example, a bold formatting style element of the style element set with a lock status of "unlocked" may be generated as an enabled "Bold" button as the enabled element editing portion. A locked italics formatting style element may be generated as a disabled "Italics" button, as will be appreciated by those skilled in the art.

The edit request may correspond to a user interaction (e.g., a button press or mouse click) with the style editing portion 710, such as clicking an enabled "Bold" button to toggle the bold formatting of a document content element. In this case, the server 100 updates the style editing portion 710 as the step of generation (1206). In another example, the server 100 updates the style editing portion 710 when the user of the electronic document selects a different document content element. In this case, the edit request indicates the selection of the different document content element. While the user may change unlocked style elements that are applied to a document content element, these changes do not change the visual style itself, as will be appreciated by those skilled in the art.

Figure 13:
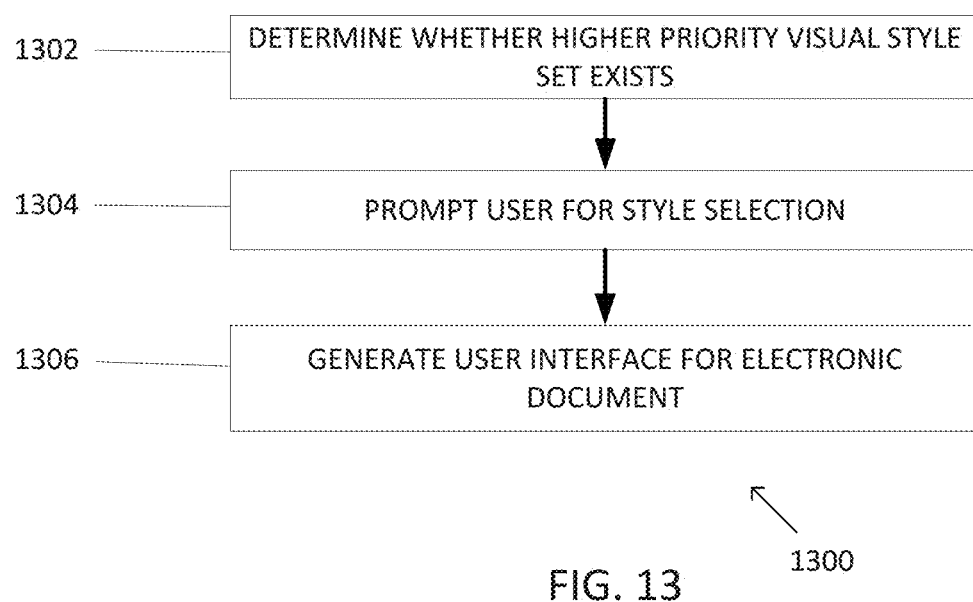
FIG. 13 is a flowchart illustrating another method for managing display of electronic documents in a client-server architecture that may be performed by the system of FIG. 1, according to an embodiment.

FIG. 13 is a flowchart 1300 of another method for managing display of electronic documents in a client-server architecture that may be performed by the system of FIG. 1, according to an embodiment. As described above, the visual style set maintenance process 120 in one example provides a version control system. The document support data for an electronic document includes a reference or link to a visual style set or style guide. The user may update the style guide over time and maintain one or more prior versions of the style guide. The server 100 determines (1302), for an electronic document associated with a first visual style set of visual styles (e.g., a first version or priority level), whether the first visual style set corresponds to a second visual style set (e.g., a second version) with a higher priority than the first visual style set. The client device 200 prompts (1304) the user of the electronic document for a style selection based on the first visual style set and the second visual style set. For example, the user may be prompted to choose between the first version and the second, higher priority version. This allows the user to prevent undesirable changes in the style of the electronic document. The client device 200 generates (1306) a user interface for the electronic document based on the style selection. As described above, the client device 200 may generate the comparison user interface 900 to display a preview of the electronic document with a comparison between the first and second visual style sets allowing the user to choose whether to choose the second visual style set.

Figure 14:
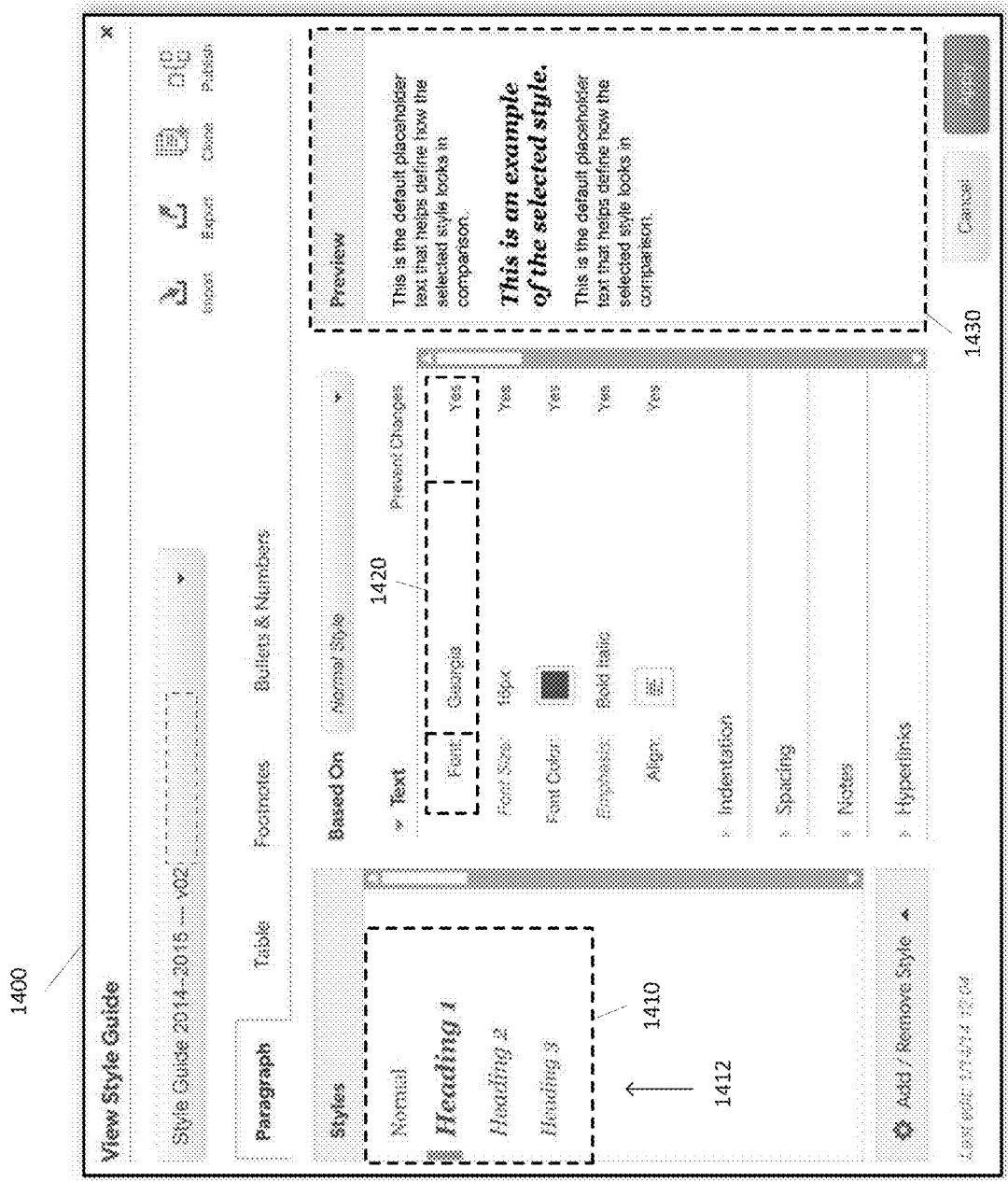
FIG. 14 is a diagram illustrating a style user interface, provided by the system of FIG. 1, for viewing a visual style set of visual styles that affect display of electronic document content, according to an embodiment.

FIG. 14 is a diagram illustrating a style user interface 1400, provided by the system 10 (e.g., via the application 210) for viewing a visual style set of visual styles (e.g., a "style guide") that affects display of electronic document content, according to an embodiment. The style user interface 1400 includes a style display portion 1410 with a set of selection indicators 1412 for visual styles of a visual style set. In the example shown in FIG. 14, the visual style set includes Normal, Heading 1, Heading 2, and Heading 3 visual styles. When a visual style is selected (e.g., by clicking on the corresponding selection indicator), the application 210 displays one or more element display portions 1420. The element display portions 1420 correspond to style elements of a style element set for the selected visual style. As shown in FIG. 14, the element display portions correspond to the Heading 1 visual style. Each displayed element display portion 1420 includes one or more of a description 1422 or other identifier of the style element, a selection indicator 1424 for a current default value of the style element, and a lock indicator 1426 for a lock status of the style element. The style user interface 1400 may further include a preview display portion 1430 that provides a sample of the selected visual style to a user. The style display portion 1410, element display portion 1420, description 1422, selection indicator 1424, lock indicator 1426, and preview display portion 1430 generally correspond to elements 410, 420, 422, 424, 426, and 430 as shown in FIG. 4, respectively, however in the example shown in FIG. 14, the element display portion 1420 is locked and thus cannot be changed by the user.

Figure 15:
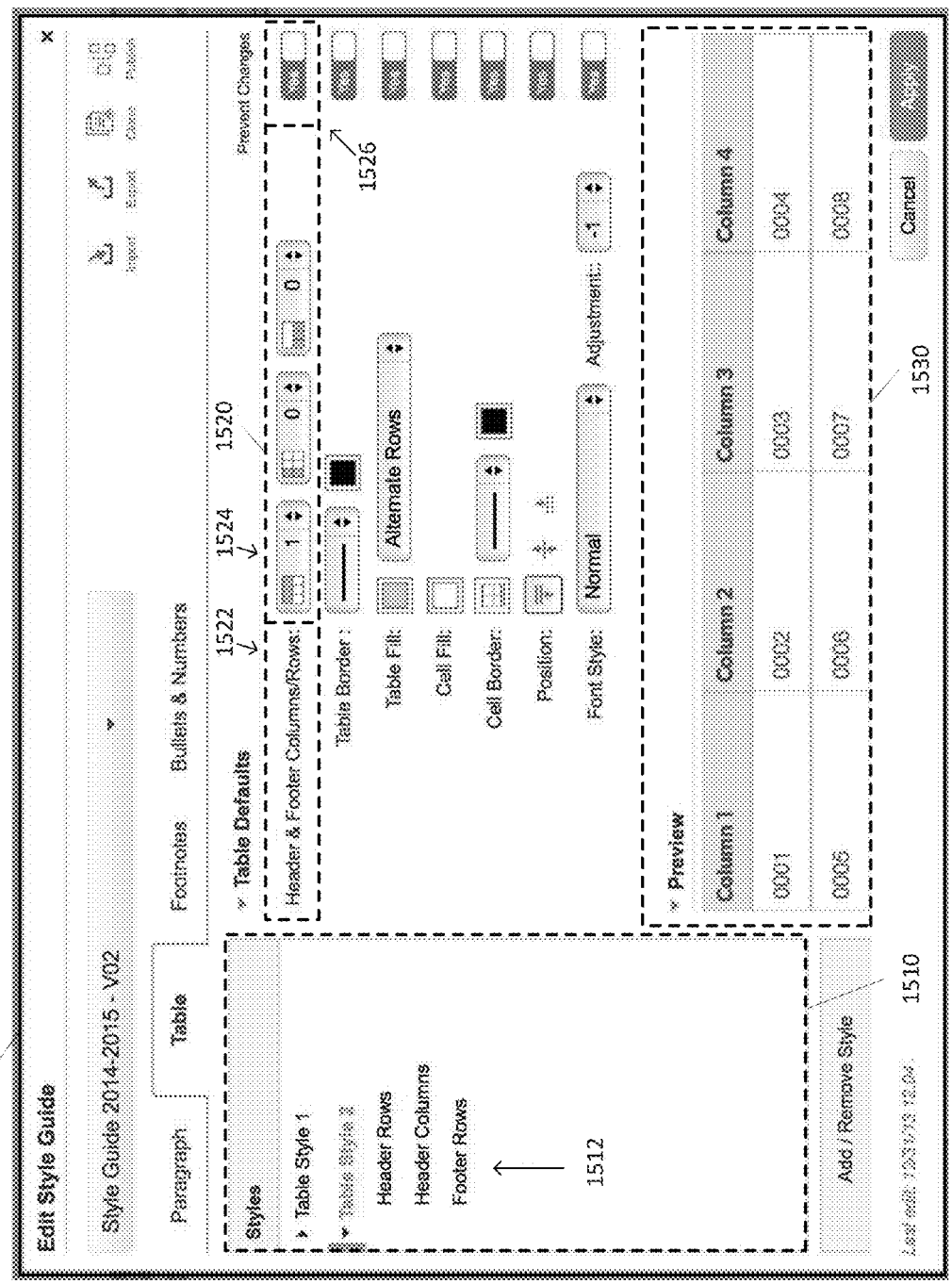
FIG. 15 is a diagram illustrating a style user interface, provided by the system of FIG. 1, for editing or viewing a visual style set, including table styles, that affects display of electronic document content, according to an embodiment.

FIG. 15 is a diagram illustrating a style user interface 1500, provided by the system 10 (e.g., via the application 210) for editing or viewing a visual style set, including table styles, that affects display of electronic document content, according to an embodiment. The style user interface 1500 includes a style display portion 1510 with a set of selection indicators 1512 for visual styles of a visual style set. In the example shown in FIG. 15, the visual style set includes Table Style 1 and Table Style 2 visual styles. When a visual style is selected (e.g., by clicking on the corresponding selection indicator), the application 210 displays one or more element display portions 1520. The element display portions 1520 correspond to style elements of a style element set for the selected visual style. Each displayed element display portion 1520 includes one or more of a description 1522 or other identifier of the style element, a selection indicator 1524 for a current default value of the style element, and a lock indicator 1526 for a lock status of the style element. The style user interface 1500 may further include a preview display portion 1530 that provides a sample of the selected visual style to a user. The style display portion 1510, element display portion 1520, description 1522, selection indicator 1524, lock indicator 1526, and preview display portion 1530 operate similarly to elements 410, 420, 422, 424, 426, and 430 as shown in FIG. 4, respectively, and thus their description is omitted. Examples of the table style elements include number indicators for header rows, header columns, and footer rows, table borders, table fill (e.g., fill color and fill pattern), cell fill, cell border, text position within a cell, font styles (e.g., based on paragraph styles), and font size adjustments. Additional style elements will be apparent to those skilled in the art.

Figure 16:
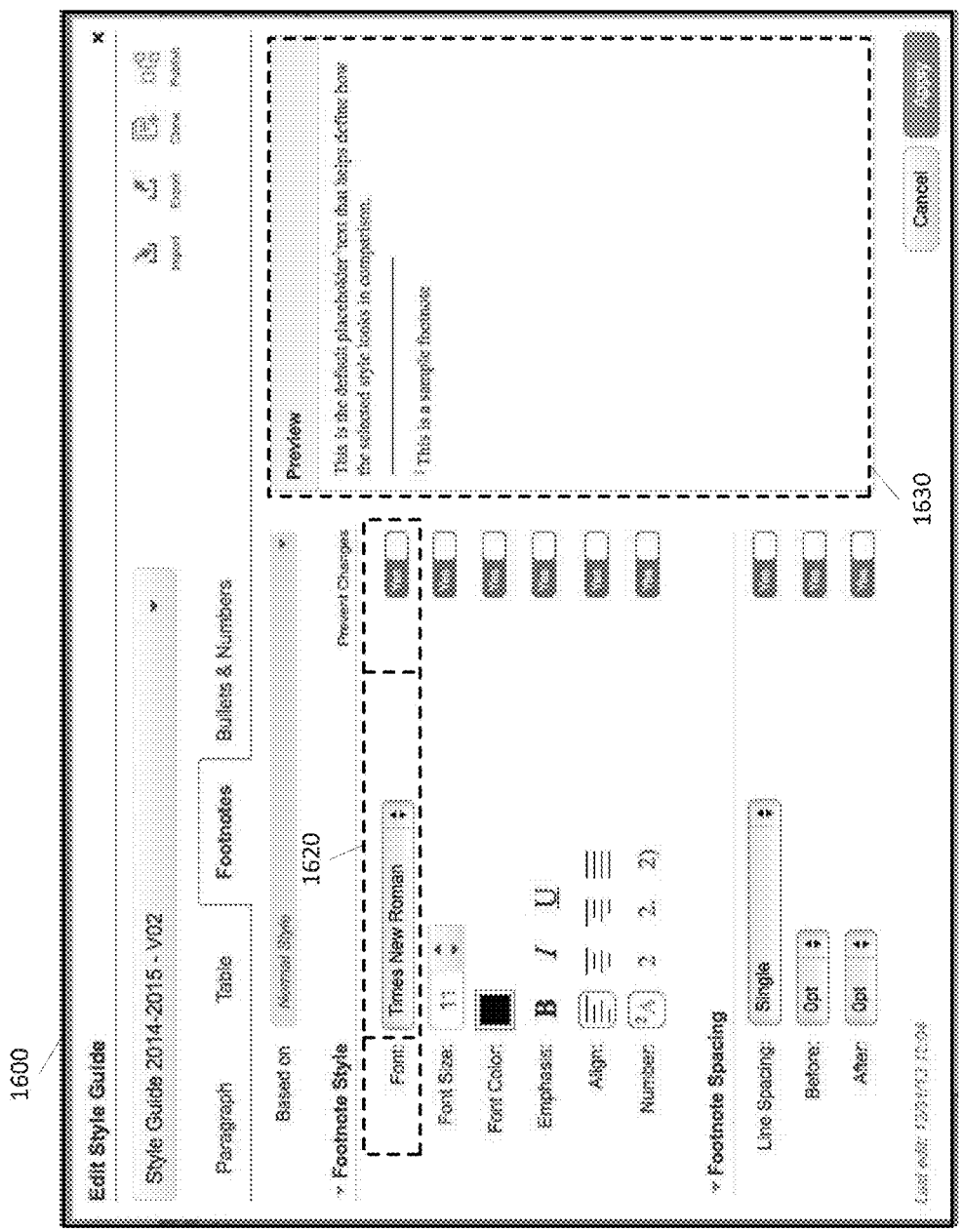
FIG. 16 is a diagram illustrating a style user interface, provided by the system of FIG. 1, for editing or viewing a visual style set, including a footnote style, that affects display of electronic document content, according to an embodiment.

FIG. 16 is a diagram illustrating a style user interface 1600, provided by the system 10 (e.g., via the application 210) for editing or viewing a visual style set, including a footnote style, that affects display of electronic document content, according to an embodiment. The style user interface 1600 includes a single footnote style of the visual style set and displays one or more element display portions 1620 and a preview display portion 1630. The element display portion 1620 and preview display portion 1630 operate similarly to elements 420 and 430 as shown in FIG. 4, respectively, and thus their description is omitted. Examples of the footnote style elements include font, font size, font color, emphasis formatting, alignment, footnote number formatting, and footnote spacing. Additional style elements will be apparent to those skilled in the art.

Figure 17:
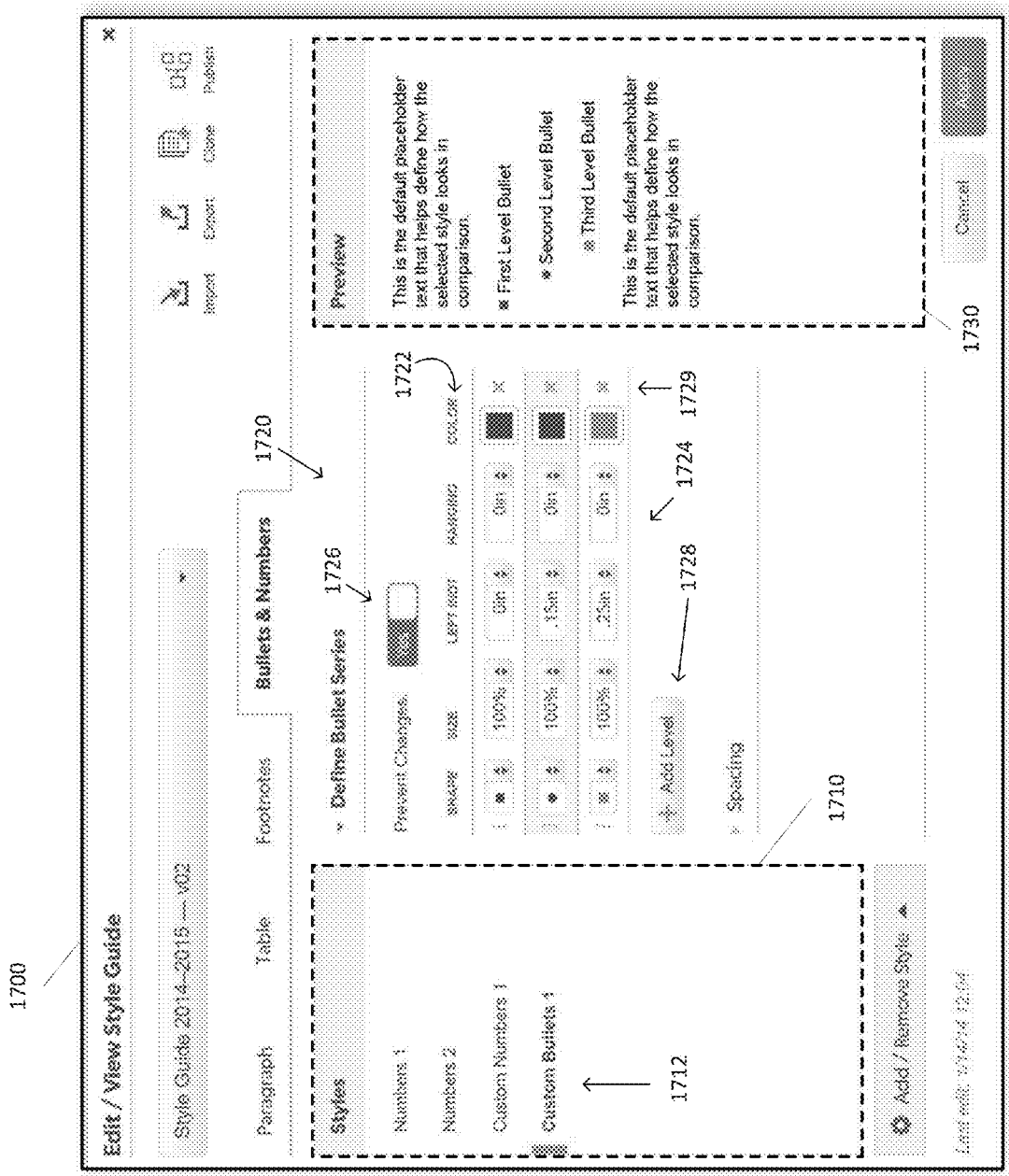
FIG. 17 and FIG. 18 are diagrams illustrating style user interfaces, provided by the system of FIG. 1, for editing or viewing a visual style set, including bulleted list styles and numbered list styles, that affects display of electronic document content, according to an embodiment.
Figure 18:
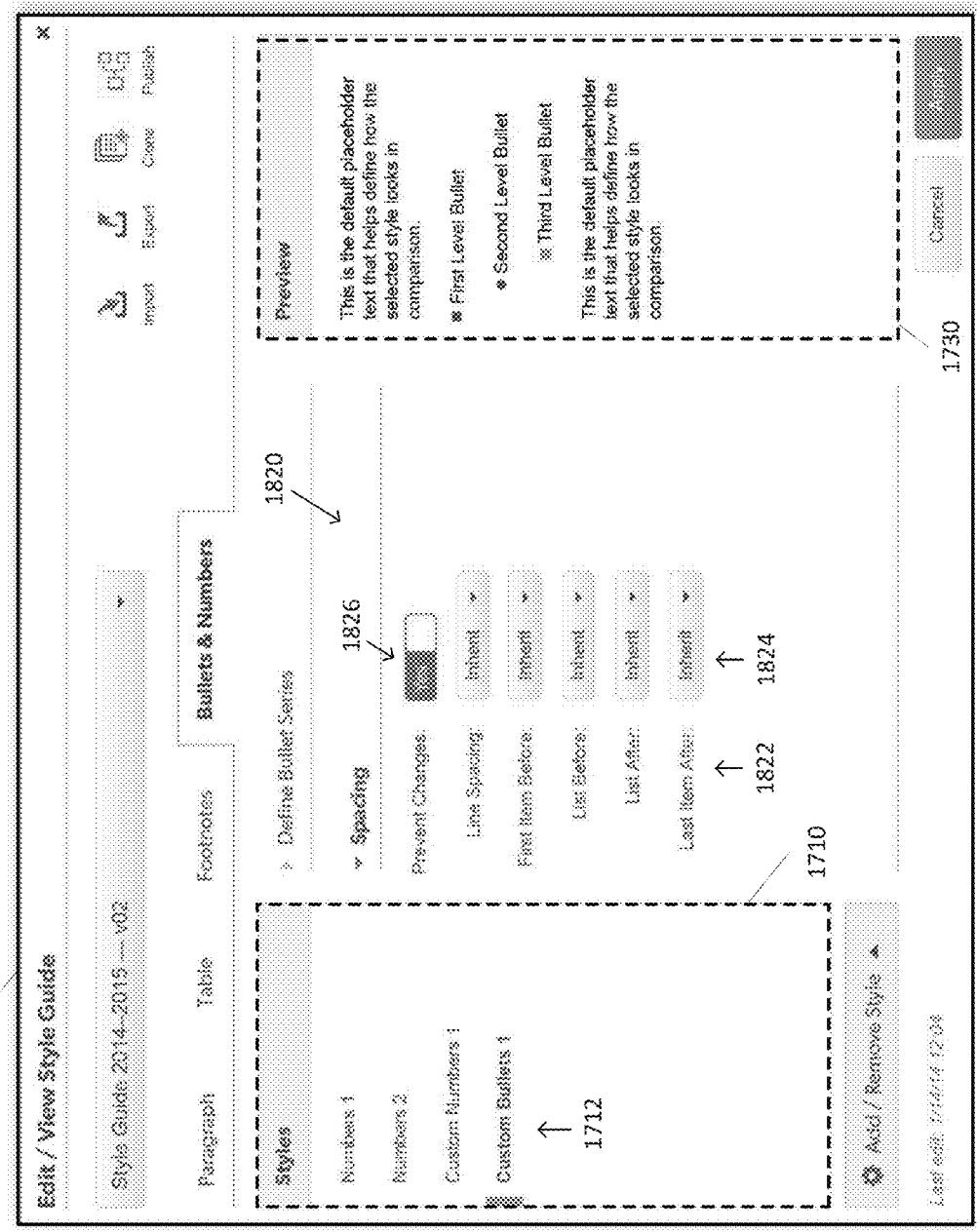

FIG. 17 and FIG. 18 are diagrams illustrating style user interfaces 1700 and 1800, provided by the system 10 (e.g., via the application 210) for editing or viewing a visual style set, including bulleted list styles and numbered list styles, that affects display of electronic document content, according to an embodiment. The style user interfaces 1700 and 1800 include a style display portion 1710 with a set of selection indicators 1712 for visual styles of a visual style set. In the example shown in FIGS. 17 and 18, the visual style set includes Numbers 1 and Numbers 2 as default numbered list styles and Custom Numbers 1 and Custom Bullets 1 as a user-created numbered list visual style and a user-created bulleted list visual style, respectively. When a visual style is selected (e.g., by clicking on the corresponding selection indicator), the application 210 displays one or more element display portions 1720. The element display portion 1720 as shown in FIG. 17 is displayed for the Custom Bullets 1 visual style and includes a single lock indicator 1726 for multiple style elements that define a bullet series, including descriptions 1722 and selection indicators 1724 for bullet shape, size, left indent, hanging indent, and bullet color. The style user interface 1700 allows the user to create an additional bullet row or delete existing bullet rows using button 1728 or buttons 1729, respectively. The style user interface 1700 may further include a preview display portion 1730 that provides a sample of the selected visual style to a user. The element display portion 1820 as shown in FIG. 18 is displayed for the Custom Bullets 1 visual style and includes a single lock indicator 1826 for multiple style elements that define spacing of the bullet series, including line spacing within a bullet, line spacing before the bullet series, line spacing before a bullet item, line spacing after a bullet item, and line spacing after the bullet series. The style display portion 1710, element display portions 1720 and 1820, descriptions 1722 and 1822, selection indicators 1724 and 1824, lock indicators 1726 and 1826, and preview display portion 1730 operate similarly to elements 410, 420, 426, and 430 as shown in FIG. 4, respectively, and thus their description is omitted.

Figure 19:
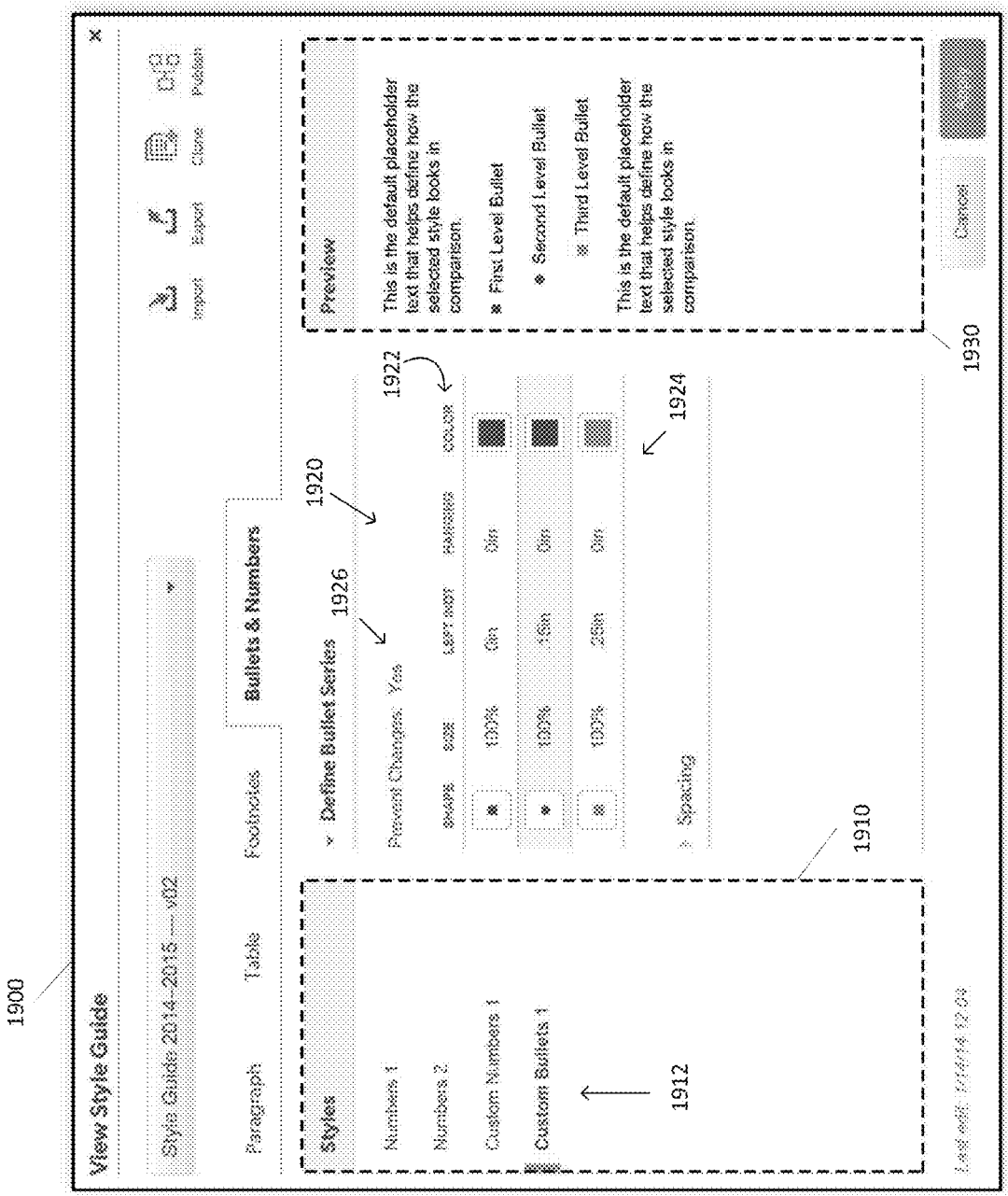
FIG. 19 and FIG. 20 are diagrams illustrating style user interfaces, provided by the system of FIG. 1, for viewing a visual style set of visual styles, including bulleted list styles and numbered list styles, that affects display of electronic document content, according to an embodiment.
Figure 20:
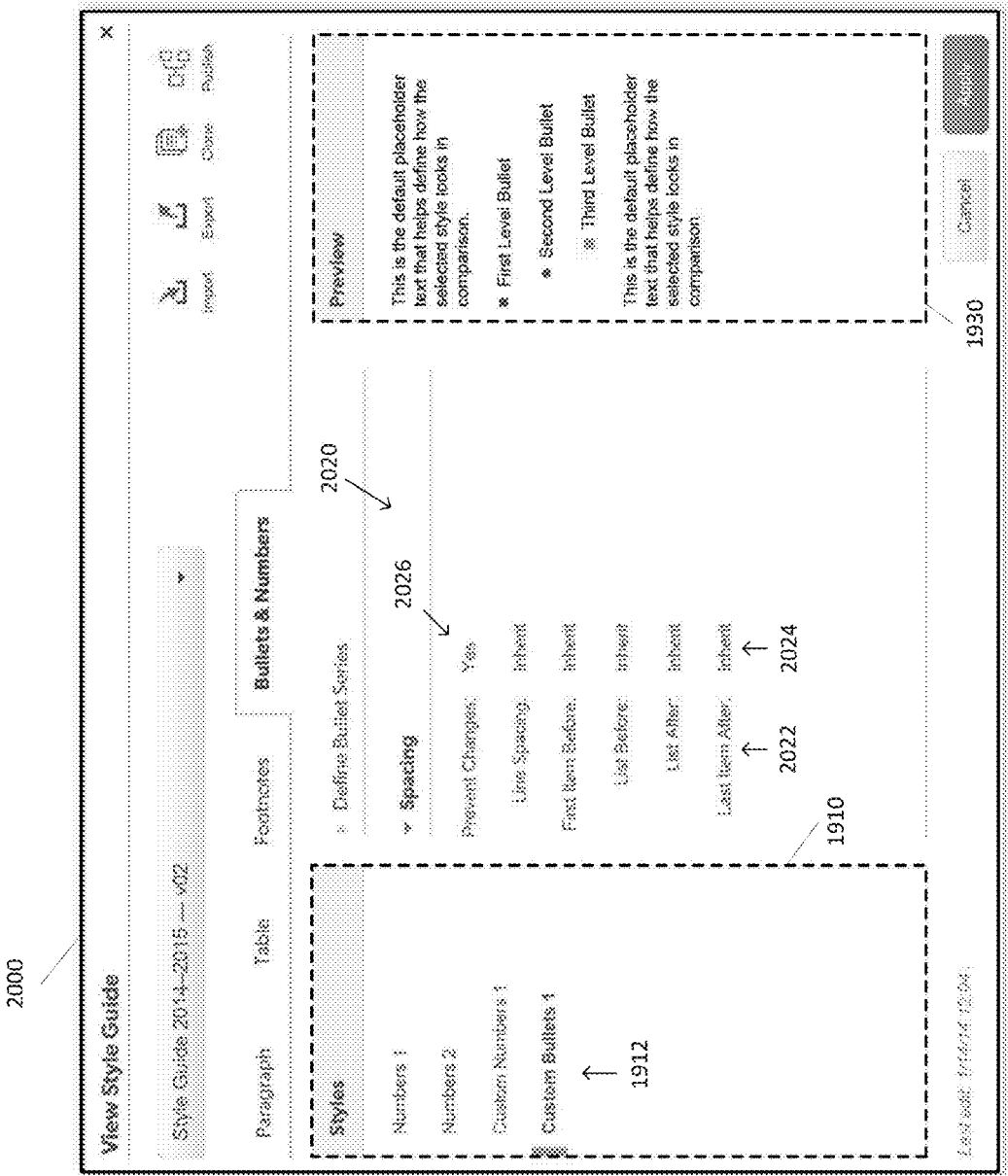

FIG. 19 and FIG. 20 are diagrams illustrating style user interfaces 1900 and 2000, provided by the system 10 (e.g., via the application 210) for viewing a visual style set of visual styles, including bulleted list styles and numbered list styles, that affects display of electronic document content, according to an embodiment. The style user interfaces 1900 and 2000 include a style display portion 1910 with a set of selection indicators 1912 that corresponds to the visual style set of FIGS. 17 and 18. FIG. 19 illustrates an element display portion 1920 that corresponds to the Custom Bullets 1 visual style and provides descriptions 1922 of the style elements for the bullet series shown in FIG. 17, selection indicators 1924 for current default values of the style elements, and a lock indicator 1926 for a lock status of the style element. The style user interface 1900 further includes a preview display portion 1930 that provides a sample of the Custom Bullets 1 visual style to a user. FIG. 20 illustrates an element display portion 2020 that corresponds to the Custom Bullets 1 visual style and provides descriptions 2022 of the style elements for the spacing style elements shown in FIG. 18, selection indicators 2024 for current default values of the spacing style elements, and a lock indicator 2026 for a lock status of the spacing style elements. The style user interface 2000 further includes the preview display portion 1930 that provides a sample of the Custom Bullets 1 visual style to a user. The style display portion 1910, element display portions 1920 and 2020, descriptions 1922 and 2022, selection indicators 1924 and 2024, lock indicators 1926 and 2026, and preview display portion 1930 operate similarly to elements 410, 420, 422, 424, 426, and 430 as shown in FIG. 4, respectively, however in the examples shown in FIGS. 19 and 20, the element display portions 1920 and 2020 are locked and thus cannot be changed by the user.

It can be seen from the foregoing that a method and apparatus for controlling visual formatting of an electronic document has been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

We claim:

1. A method for managing display of electronic documents, comprising:
   generating a user interface for a visual style set of visual styles that affect display of electronic document content, wherein a visual style of the visual style set comprises a style element set of style elements;
   receiving, via the user interface, a lock status corresponding individually to a style element of the style element set, wherein the lock status indicates whether the corresponding style element is editable or non-editable by a user of an electronic document associated with the visual style set; and
   storing the visual style set with the lock status for the corresponding style element.

2. The method of claim 1, wherein generating the user interface comprises:
   generating an element display portion of the user interface that displays a description, a selection indicator, and a lock indicator that correspond to the style element;
   wherein the selection indicator corresponds to a default value for the style element, wherein the default value is user-editable via the element display portion;
   wherein the lock indicator corresponds to the lock status for the corresponding style element, wherein the lock status is user-editable via the element display portion.

3. The method of claim 2, wherein the style element corresponds to one of a font face, font size, font color, emphasis format, alignment, spacing, border, or background color for the visual style.

4. The method of claim 2, wherein generating the user interface comprises:
   generating a preview display portion of the user interface that displays a document content element based on a current selection indicator for each style element of the style element set.

5. The method of claim 2, further comprising:
   generating a description display portion that displays a use description for the visual style, wherein the use description is user-editable via the description display portion.

6. The method of claim 2, wherein the user interface comprises a style user interface, the method further comprising:
   generating a document user interface for an electronic document associated with the visual style set;
   wherein the document user interface comprises a document display portion that displays the electronic document based on the visual style set.

7. The method of claim 2, wherein storing the visual style set comprises:
   publishing the visual style set with a version control system;
   notifying the user of the electronic document associated with the visual style set.

8. The method of claim 2, wherein the visual style set comprises at least one of a table style, row style, column style, numbered list style, or bulleted list style.

9. A method for managing display of electronic documents in a client-server architecture, comprising:
   on the server:
   generating a document user interface for editing an electronic document, wherein the electronic document is associated with a visual style set of visual styles;
   receiving an edit request for a selected visual style of the visual style set, wherein the selected visual style comprises a style element set of style elements;
   generating a style editing portion of the document user interface, for editing the selected visual style, based on a lock status set of lock statuses that corresponds to the style element set, wherein each lock status of the lock status set corresponds individually to a style element of the style element set;
   providing the document user interface with the style editing portion to the client for a user of the electronic document.

10. The method of claim 9, wherein generating the style editing portion comprises:

generating an enabled element editing portion for each style element of the style element set with a corresponding lock status of the lock status set that indicates the style element is editable by the user of the electronic document.

11. The method of claim 10, wherein generating the style editing portion comprises:
generating the style editing portion with a disabled element editing portion for each style element of the style element set with a corresponding lock status of the lock status set that indicates the style element is non-editable by the user of the electronic document.

12. The method of claim 9, wherein generating the document user interface comprises:
generating a style display portion of the document user interface that displays a selection indicator set of selection indicators that corresponds to the visual style set.

13. The method of claim 12, wherein the style display portion displays, upon a mouse-hover event for a selection indicator of the selection indicator set, a use description associated with a visual style of the visual style set that corresponds to the selection indicator.

14. The method of claim 9, further comprising:
on the server:
storing style data for the visual style set of visual styles that affect display of document content of the electronic document, wherein each lock status of the lock status set indicates whether the corresponding style element of the style element set is editable or non-editable;
storing, for the electronic document, document content data and document support data, wherein the document support data comprises a reference to the visual style set;
wherein generating the document user interface comprises generating the document user interface based on the document content data, the document support data, and the style data.

15. The method of claim 14, wherein storing the document content data and the document support data comprises:
storing the document content data and the document support data separately from the style data.

16. A method for managing display of electronic documents in a client-server architecture, comprising:
on the server:
determining, for an electronic document associated with a first visual style set of visual styles that affect display of electronic document content, whether the first visual style set corresponds to a second visual style set of visual styles with a higher priority than the first visual style set, wherein a visual style of the first visual style set and a corresponding visual style of the second visual style set are associated with a same electronic document content element of the electronic document, wherein a visual style of the first visual style set comprises a style element set of style elements, wherein a lock status corresponds individually to a style element of the style element set, wherein the lock status indicates whether the corresponding style element is editable or non-editable by a user of the electronic document;
providing a first user interface to the client that prompts the user of the electronic document for a selection of a visual style set based on the first visual style set and the second visual style set;
providing a second user interface, to the client, for the electronic document based on the selected visual style set.

17. The method of claim 16, wherein providing the first user interface comprises:
generating a comparison user interface for the electronic document;
generating a first document display portion of the comparison user interface that displays the electronic document based on the first visual style set;
generating a second document display portion of the comparison user interface that displays the electronic document based on a second visual style set of visual styles, without modification to the association between the electronic document and the first visual style set; and
providing the comparison user interface to the client for display to the user of the electronic document.

18. The method of claim 16, wherein providing the second user interface comprises:
generating a comparison user interface for the electronic document;
generating a document display portion of the comparison user interface that displays a first view of the electronic document based on the first visual style set or a second view of the electronic document based on the second visual style set, wherein the comparison user interface allows toggling of the document display portion between the first view and the second view without modification to the association between the electronic document and the first visual style set; and
providing the comparison user interface to the client for display to the user of the electronic document.

19. A server for managing display of electronic documents comprising:
a memory;
a server processor that comprises:
a style user interface generator that generates a style user interface for a visual style set of visual styles that affect display of electronic document content, wherein a visual style of the visual style set comprises a style element set of style elements;
a document user interface generator that generates a document user interface for editing an electronic document, wherein the electronic document is associated with the visual style set;
wherein the style user interface generator generates an element display portion for a style element of the style element set that corresponds individually to a user-editable lock status;
wherein the document user interface generator generates a style editing portion of the document user interface, for editing the visual style, based on the user-editable lock status that corresponds to the style element.

20. The server of claim 19, wherein the style user interface generator generates the element display portion with a description, a selection indicator, and a lock indicator that correspond to the style element, wherein the lock indicator corresponds to the user-editable lock status that corresponds to the style element.

* * * * *